US010727780B2

(12) United States Patent
Kobayashi

(10) Patent No.: US 10,727,780 B2
(45) Date of Patent: Jul. 28, 2020

(54) PANEL MEMBER SECURING STRUCTURE AND PANEL MEMBER SECURING TOOL

(71) Applicant: Yanegijutsukenkyujo Co., Ltd., Takahama-shi, Aichi (JP)

(72) Inventor: Shuichi Kobayashi, Takahama (JP)

(73) Assignee: Yanegijutsukenkyujo Co., Ltd., Takahama-shi, Aichi (JP)

( * ) Notice: Subject to any disclaimer, the term of this patent is extended or adjusted under 35 U.S.C. 154(b) by 0 days.

(21) Appl. No.: 16/392,496

(22) Filed: Apr. 23, 2019

(65) Prior Publication Data

US 2019/0372507 A1 Dec. 5, 2019

(30) Foreign Application Priority Data

May 30, 2018 (JP) .................. 2018-103775

(51) Int. Cl.
*H02S 20/23* (2014.01)
*F16B 2/06* (2006.01)
*F16B 5/06* (2006.01)
*E04D 13/158* (2006.01)
*F24S 20/67* (2018.01)
*F24S 25/33* (2018.01)
*F24S 25/65* (2018.01)
*F24S 25/60* (2018.01)

(52) U.S. Cl.
CPC ............ *H02S 20/23* (2014.12); *E04D 13/158* (2013.01); *F16B 2/065* (2013.01); *F16B 5/065* (2013.01); *F16B 5/0628* (2013.01); *F24S 20/67* (2018.05); *F24S 25/33* (2018.05); *F24S 25/65* (2018.05); *F24S 2025/6006* (2018.05)

(58) Field of Classification Search
CPC ........ E04D 13/158; F24S 20/67; F24J 2/5256; F24J 2/5258; F24J 2/526; F24J 2/5264; F24J 2/5254; H02S 20/30; H02S 20/23; F16H 25/20

See application file for complete search history.

(56) References Cited

U.S. PATENT DOCUMENTS 9,276,519 B2 * 3/2016 Kobayashi .............. H02S 20/23
2011/0260027 A1 * 10/2011 Farnham, Jr. .......... H02S 20/00
248/309.1

(Continued)

FOREIGN PATENT DOCUMENTS

JP 5705380 B2 1/2014

*Primary Examiner* — Beth A Stephan
(74) *Attorney, Agent, or Firm* — Ken Ichiro Yoshida

(57) ABSTRACT

At least one panel member is secured to a base member using a securing tool including a stand that holds a shaft having an external thread and restricts the axial movement of the shaft, a lower holder that has a center portion in which a cylindrical portion through which the stand is inserted is provided, and a first and a second placement surfaces which extend from the center portion, and an upper holder that has a flat plate portion through which a bolt hole portion and a tool hole portion are provided, a first and a second panel pressing portions which extend from the flat plate portion, wherein in the securing tool, a bolt inserted through the bolt hole portion is screwed with a first screwed groove formed in the center portion, and the external thread is screwed with a second screwed groove formed on the cylindrical portion.

7 Claims, 11 Drawing Sheets

(56) References Cited

U.S. PATENT DOCUMENTS

| | | | |
|---|---|---|---|
| 2015/0168021 A1* | 6/2015 | Wentworth | F24S 25/636 |
| | | | 52/173.3 |
| 2015/0288320 A1* | 10/2015 | Stearns | F24S 25/70 |
| | | | 52/173.3 |
| 2016/0126884 A1* | 5/2016 | Stearns | H02S 20/23 |
| | | | 52/173.3 |
| 2016/0268958 A1* | 9/2016 | Wildes | H02S 20/23 |
| 2017/0040931 A1 | 2/2017 | Schuit et al. | |
| 2017/0063288 A1* | 3/2017 | Schuit | F16M 13/02 |
| 2017/0302221 A1* | 10/2017 | Jasmin | H02S 20/23 |
| 2017/0366131 A1* | 12/2017 | Stearns | F24S 25/65 |
| 2018/0062570 A1* | 3/2018 | Murakami | H02S 30/10 |

* cited by examiner

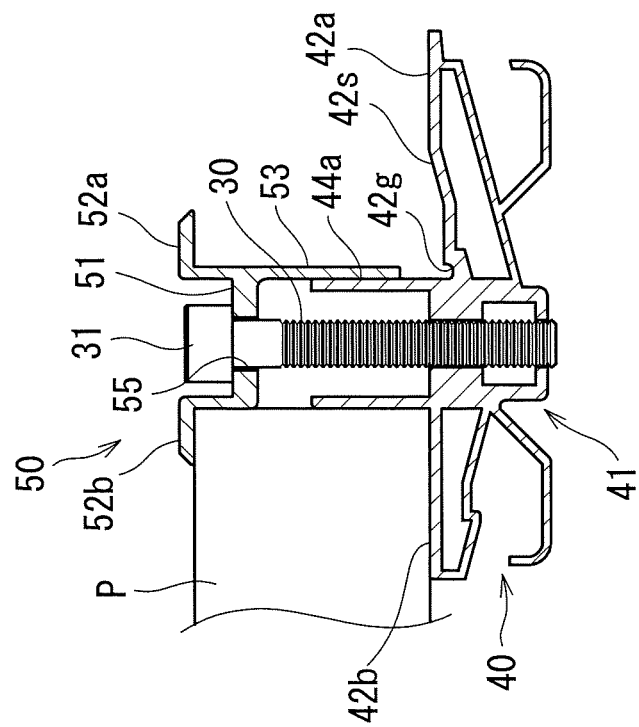
Fig. 6A
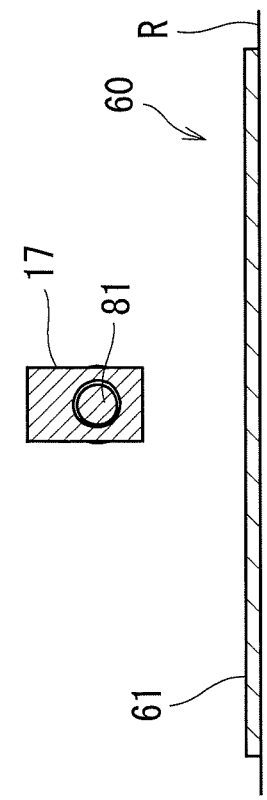
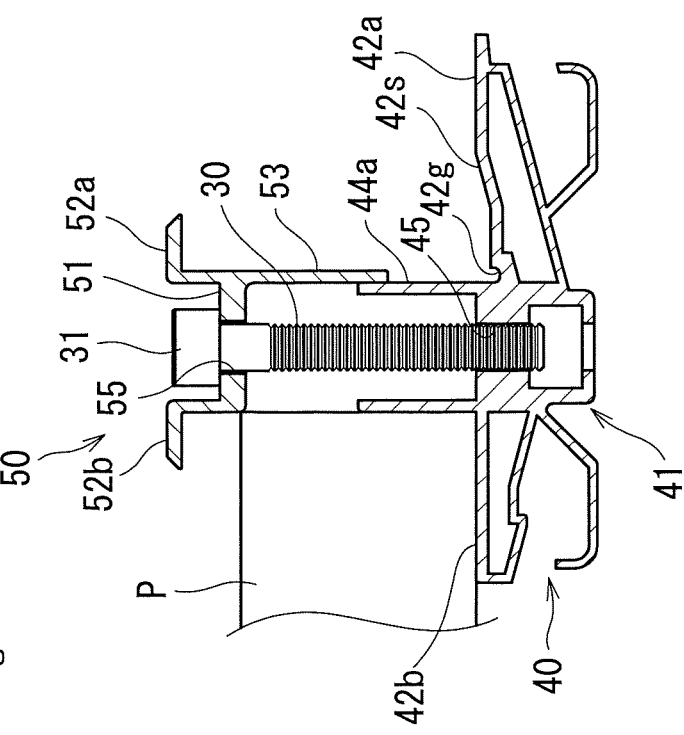
Fig. 6B
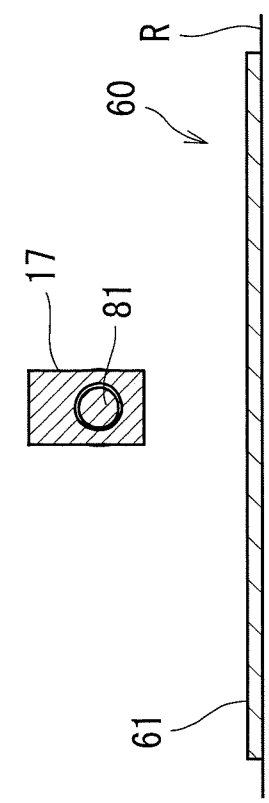

PANEL MEMBER SECURING STRUCTURE AND PANEL MEMBER SECURING TOOL

BACKGROUND OF THE INVENTION

Field of the Invention

The present invention relates to a panel member securing structure in which a panel member such as a solar cell module is secured onto a roof face, and a panel member securing tool that is used for the securing structure.

Description of the Related Art

When a panel member such as a solar cell module, in which the peripheral edge of a solar cell panel is held by a frame, and a solar water heater is installed on a roof, a base member that is fastened onto a roof face and a securing tool that secures the panel member to the base member are used in some cases.

In the above-described installation of the panel member, the height of the panel member is desired to be adjusted in some cases. For example, when the plurality of panel members are mounted on the roof, the heights of the upper surfaces of the panel members are non-uniform depending on positions at which the base members are fastened on the roof face due to a shape of a roof material covering the roof. Alternatively, the height of the panel member is desired to be set in consideration of relations with other structures on the roof in some cases. For meeting these desires, the present applicant has proposed a securing structure enabling height adjustment of a panel member by interposing a spacer between a base member and a securing structure (see Patent Document No. 1, Japanese Patent No. 5705380).

This proposal however requires the height adjustment to be performed before the panel member is placed on the base member. When the height adjustment becomes necessary after the panel member is placed, the panel member needs to be once detached and construction efficiency is therefore lowered. For this reason, a securing tool enabling the height adjustment in a state in which the panel member is placed has been desired.

In recent years, a proposal that is intended to meet such a desire has been also made (see Patent Document No. 2, US Patent Application Publication No. 2017/0040931). A securing tool in this proposal is aimed at securing solar panels (hereinafter, simply referred to as "panels") on a roof face with a base member interposed therebetween, and includes a stanchion standing from the base member, a lower bracket on which the panels are placed, and an upper bracket for holding the panels between it and the lower bracket. The stanchion has two arms each of which extends in the up-down direction and has teeth and grooves formed on the inner side surfaces of both of the arms, which face each other. A helical drive is held in a rotatable manner on a shelf-like portion formed in a bottom portion of the lower bracket and an external thread exposed from the holding portion is engaged with the teeth and grooves of the stanchion. An aperture for a tool is formed in the helical drive and can be accessed through apertures that are penetratingly provided in the upper bracket and the lower bracket.

Further, an aperture for a bolt is penetratingly provided in the upper bracket in addition to the aperture for the tool, and the bolt inserted through the aperture is screwed with a screwed groove formed on the lower bracket.

With the securing tool disclosed in Patent Document No. 2 having the above-described configuration, the helical drive is moved up and down along the arms of the stanchion by rotating the helical drive with the tool. The lower bracket holding the helical drive in the rotatable manner is thereby moved up and down together with the helical drive. Accordingly, the height adjustment of the panels can be performed in a state in which the panels are placed on the lower bracket. By fastening the bolt inserted through the aperture of the upper bracket to the screwed groove of the lower bracket, the panels are secured to the lower bracket so as to be pressed by the upper bracket. The panels held between the upper bracket and the lower bracket are mounted on the roof face with the stanchion and the base member interposed therebetween.

With this configuration, force that the lower bracket holds the panels together with the upper bracket acts on an engagement portion between the external thread of the helical drive and the teeth and grooves (screwed groove) of the stanchion. The securing tool disclosed in Patent Document No. 2 however has the risk that holding of the panels becomes unstable because the length of the engagement between the external thread and the screwed groove is small.

Patent Document No. 1: Japanese Patent No. 5705380
Patent Document No. 2: US Patent Application Publication No. 2017/0040931

SUMMARY OF THE INVENTION

The present invention has been made in consideration of the above-described circumstances, and an object thereof is to provide a panel member securing structure that can adjust a height of a panel member in a state of holding the panel member with a securing tool and is mounted on a roof face in a state in which the panel member is held stably, and a panel member securing tool that is used for the securing structure.

In order to achieve the above-described object, a panel member securing structure (hereinafter, simply referred to as a "securing structure" in some cases) according to an aspect of the present invention is "a panel member securing structure including a base member fastened to a roof face, and a securing tool securing at least one panel member to the base member, wherein the securing tool includes a stand, a lower holder that moves up and down along the stand, an upper holder that holds the panel member together with the lower holder, and a shaft that has an external thread formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engagement portion on an end portion, the lower holder has a center portion in which a cylindrical portion through which the stand is inserted is penetratingly provided, a first screwed groove which is formed at such a position as not to interfere with the cylindrical portion in the center portion, a second screwed groove which is formed on an inner circumferential surface of the cylindrical portion, and a first placement surface and a second placement surface which extend in directions orthogonal to an axial direction of the cylindrical portion at both of outer sides of the center portion, the upper holder has a flat plate portion in which a bolt hole portion and a tool hole portion are penetratingly provided, a first panel pressing portion which extends from the flat plate portion in the same direction as the first placement surface, and a second panel pressing portion which extends from the flat plate portion in the same direction as the second placement surface, the stand stands from the base member, a bolt inserted through the bolt hole portion is fastened to the first screwed groove, so that the panel member is held at least one of between the first placement surface and the first panel pressing portion and between the second placement surface and the second panel pressing portion, a portion of the external thread, which is exposed from the stand, and the second screwed groove are screwed with each other, and the tool hole portion is located on an extended line of a center axis of the shaft and a hole portion or a space is formed in the stand on the extended line between the shaft and the tool hole portion."

With this securing structure, in the securing tool, the bolt inserted through the bolt hole portion of the upper holder is fastened to the first screwed groove of the lower holder in the state in which the panel member is placed on at least one of between the first placement surface of the lower holder and the first panel pressing portion of the upper holder and between the second placement surface of the lower holder and the second panel pressing portion of the upper holder. Thus, the panel member is held between the upper holder and the lower holder so as to be pressed against the lower holder by the upper holder. The panel member is mounted on the roof face with the base member on which the securing tool stands interposed therebetween.

When the securing structure having this configuration is constructed, height adjustment of the panel member can be performed in a state in which the panel member is placed on the lower holder. To be specific, the shaft has the tool engagement portion that is engaged with a tool, the tool hole portion provided in the upper holder is located on the extended line of the center axis of the shaft, and the hole portion or the space is also provided along the extended line of the center axis of the shaft in the stand holding the shaft. Therefore, the tool inserted into the tool hole portion can be made to reach the tool engagement portion of the shaft to be engaged with the tool engagement portion and rotate the shaft. The stand is inserted through the cylindrical portion of the lower holder, and the portion of the external thread of the shaft, which is exposed from the stand in the radial direction, is screwed with the second screwed groove formed on the inner circumferential surface of the cylindrical portion. The stand restricts the movement of the shaft in the axial direction. When the shaft is rotated, the lower holder is moved up and down while the shaft itself does not move up and down. As described above, the configuration for moving up and down the lower holder is provided in the cylindrical portion of the lower holder and gives no influence on the first placement surface and the second placement surface at both of the outer sides of the center portion in which the cylindrical portion is formed. Accordingly, the height adjustment of the panel member can be performed by moving up and down the lower holder on which the panel member is placed.

In a construction site at which the panel members are installed on the roof face, the height adjustment of the panel member is desired to be performed after the bolt is fastened to the first screwed groove, that is, the panel member is firmly held between the upper holder and the lower holder. In order to meet this desire, in the securing structure, the first screwed groove to which the bolt inserted through the bolt hole portion of the upper holder is fastened is formed in the lower holder that moves up and down. Therefore, even after at least one panel member is held between the upper holder and the lower holder by fastening the bolt to the first screwed groove, the height adjustment of the panel member can be performed. It is needless to say that the securing structure can be constructed by performing the height adjustment of the panel member in a state in which the panel member is placed on the lower holder even at a stage where the upper holder is temporarily secured to the lower holder by the bolt or at a stage where the upper holder is not attached to the securing tool.

With the securing tool disclosed in Patent Document No. 2 described above as a conventional technique, of the external thread (helical drive) that is rotated by the tool for moving up and down the lower bracket and the screwed groove (teeth and grooves) that is engaged with the external thread, the external thread is held on the lower bracket. That is to say, "the external thread of which the outer circumferential surface needs to be exposed" in order to be engaged with the screwed groove is held on the bottom portion of the lower bracket. Therefore, even when the screwed groove formed on the stanchion can be elongated, it is structurally difficult to elongate the external thread that is exposed in the bottom portion of the lower bracket. The length of the engagement between the external thread and the screwed groove is inevitably decreased in the securing tool disclosed in Patent Document No. 2. For this reason, there has been the risk that holding of the panels becomes unstable.

On the other hand, in the securing tool that is used for the securing structure, of the external thread (the external thread of the shaft) and the screwed groove (second screwed groove) that is engaged with the external thread, the screwed groove is formed in the lower holder. The screwed groove can be increased in length because it is formed "inside" the lower holder. To be specific, the second screwed groove is formed on the inner circumferential surface of the cylindrical portion that is penetratingly provided in the lower holder, so that the second screwed groove can be formed over the entire length of the cylindrical portion, that is, over the entire height of the center portion of the lower holder. The securing structure can therefore increase the length of the engagement between the external thread of the shaft and the second screwed groove, thereby holding the panel member stably.

Further, the shaft having the external thread is held between the pair of side wall portions of the stand in the state in which the movement thereof in the axial direction is restricted. As a mode thereof, a mode in which a top surface portion connects the upper ends of the pair of side wall portions, a bottom surface portion connects the lower ends thereof, and a distance between the top surface portion and the bottom surface portion is slightly larger than the length of the shaft can be exemplified. Alternatively, a mode in which upper shelf portions project toward each other from the upper ends of the pair of side wall portions with a space therebetween, the bottom surface portion connects the lower ends thereof, and a distance between the upper shelf portions and the bottom surface portion is slightly larger than the length of the shaft can be exemplified. With these modes, the length of the shaft is substantially equal to the length of the side wall portions, and eventually, the length of the stand. Accordingly, there is an advantage that the presence of the shaft can increase mechanical strength of the stand in the axial direction.

In the panel member securing structure in the aspect of the present invention, in addition to the above-described configuration, the configuration in which "the upper holder abuts against neither of the first placement surface nor the second placement surface" can be employed.

In the securing tool disclosed in Patent Document No. 2, the upper bracket includes a first arm and a second arm at both sides of a base portion, one panel is arranged between the first arm and the lower bracket, and the other panel is arranged between the second arm and the lower bracket. The upper bracket in Patent Document No. 2 includes a bottom wall downwardly extending from the boundary between the base portion and the second arm and the lower end of the bottom wall is received within a slot formed in the lower bracket. Therefore, when the bolt inserted through the aperture of the upper bracket is fastened to the threaded groove of the lower bracket, force of rotating about, as a fulcrum, the lower end of the bottom wall acts on the upper bracket. As a result, the bottom wall is inevitably inclined for a clearance of the height of the bottom wall relative to the height (thickness) of the panel. Accordingly, with the securing tool disclosed in Patent Document No. 2, the panel is held between the upper holder and the lower holder at the first arm side whereas the space is inevitably generated between the upper holder and the panel at the second arm side, resulting in the problem that holding of the panel becomes stable.

By contrast, in the present securing structure, the upper holder abuts against neither of the first placement surface nor the second placement surface. Therefore, the upper holder can press the panel member against the first placement surface at the first panel pressing portion side and the upper holder can also press the panel member against the second placement surface at the second panel pressing portion side. The panel member can therefore be firmly held between the upper holder and the lower holder, so that the panel member can be held stably.

Further, in the securing tool in Patent Document No. 2, the lower end of the bottom wall of the upper bracket is made to stand on the lower bracket. Therefore, the height of the bottom wall needs to correspond to the height of the panel as a holding target. For this reason, securing a plurality of types of panels having different heights has the problem that a plurality of types of upper holders including bottom walls of different heights are needed. By contrast, in the present securing structure, the upper holder abuts against neither of the first placement surface nor the second placement surface of the lower holder in the state in which the panel member is held between the upper holder and the lower holder. Therefore, even panel members having different heights can be held between the upper holders and the lower holders using a single type of the securing tools.

In the panel member securing structure in the aspect of the present invention, in addition to the above-described configuration, the configuration in which "the upper holder has a hanging wall downwardly extending from a boundary between the first panel pressing portion and the flat plate portion, the lower holder has a first wall standing from a boundary between the center portion and the first placement surface and the first placement surface has an inclination portion that is lowered toward the first wall, the panel member is held between the second placement surface and the second panel pressing portion, and the hanging wall is along the first wall outside without abutting against the first placement surface" can be employed.

As described above, in the securing structure according to the aspect of the present invention, the height adjustment of the panel member can be performed by rotating the shaft by the tool in a state in which the panel member is placed on the lower holder and the bolt is fastened to the first screwed groove to thereby hold the panel member between the upper holder and the lower holder. The height adjustment of the panel members can also be performed in a state in which the panel members are held between the first placement surface and the first panel pressing portion and between the second placement surface and the second panel pressing portion. In this case, depending on the sizes of the panel members, the above-described height adjustment requires an operator to get on the panel members. As construction procedures for adjusting the heights of the panel members in the state of being held between the upper holder and the lower holder without requiring the operator to get on the panel members, the following procedures can be supposed. That is, an operation of mounting the plurality of panel members using the plurality of securing tools is performed in one direction on the roof face in such a manner that height adjustment is performed in a state in which the panel member is held between the upper holder and only one of the first placement surface and the second placement surface, and then, the next panel member is held between the upper holder and the other placement surface.

In the case in which the above-described construction procedures are employed, when the bolt inserted through the bolt hole portion of the upper holder is fastened to the first screwed groove in the state in which the panel member is placed on only one of the first placement surface and the second placement surface, the failure that the upper holder is inclined so as to be lowered at the side at which no panel member is placed can occur. For avoiding this failure, with this configuration, the first wall stands from the boundary between the center portion and the first placement surface in the lower holder, the hanging wall downwardly extends from the boundary between the flat plate portion and the first panel pressing portion in the upper holder, and the hanging wall is along the first wall outside without abutting against the first placement surface. Therefore, when the bolt penetrating through the upper holder is fastened to the first screwed groove in the state in which the panel member is placed only on the second placement surface, the hanging wall abuts against the first wall from outside to thereby prevent the upper holder from being inclined so as to be lowered toward the first placement surface. Accordingly, the plurality of panel members can be mounted using the plurality of securing tools in one direction on the roof face in such a manner that the height adjustment is performed in the state in which the panel member is held only between the second placement surface and the second panel pressing portion, and then, the panel member is held between the first placement surface and the first panel pressing portion.

When the panel members are mounted on the roof face in one direction toward the first placement surface from the second placement surface as described above, the panel member is placed on the first placement surface after the bolt penetrating through the upper holder is fastened to the first screwed groove. Therefore, when the first placement surface is located on the same plane as the second placement surface, only a gap equal to the height of the panel member is formed between the first placement surface and the upper surface and a clearance necessary for placing the panel member on the first placement surface is not formed. By contrast, with this configuration, the inclination portion that is lowered toward the first wall, that is, toward the boundary between the first placement surface and the center portion is formed on the first placement surface on which the panel member is to be placed later. This inclination portion enables the panel member to be inserted into between the upper holder and the first placement surface by sliding the panel member along the inclination portion even after the bolt penetrating through the upper holder is fastened to the first screwed groove.

In the panel member securing structure in the aspect of the present invention, in addition to the above-described configuration, the configuration in which "the plurality of securing tools are arranged in parallel while making a direction toward the first placement surfaces from the second placement surfaces be identical to an eaves-ridge direction toward ridge from eaves on the roof face, the lower holder of an end portion securing tool arranged at an eaves end among the plurality of securing tools arranged in parallel in the eaves-ridge direction has a second wall standing from a boundary between the center portion and the second placement surface in the lower holder, and an eaves cover is hooked onto an upper end of the second wall and a part of the eaves cover stands at the eaves side relative to the second panel pressing portion with a height higher than the second panel pressing portion" can be employed.

When the plurality of panel members are mounted using the plurality of securing tools arranged in parallel while making the direction toward the first placement surfaces from the second placement surfaces be identical to the eaves-ridge direction toward the ridge from the eaves on the roof face, the securing tool at an intermediate position excluding the eaves end and the ridge end holds the panel members at both of the first placement surface side and the second placement surface side whereas the securing tool at the eaves end holds the panel member only at the first placement surface side. Therefore, in the securing tool at the eaves end, when the bolt penetrating through the upper holder is fastened to the first screwed groove, the upper holder can be inclined so as to be lowered toward the second placement surface. For avoiding this risk, with this configuration, the second wall stands from the boundary between the center portion and the second placement surface in the lower holder of the end portion securing tool arranged at the eaves end, and a part of the eaves cover hooked onto the second wall stands at the eaves side relative to the second panel pressing portion with the height higher than the second panel pressing portion of the upper holder. Accordingly, abutment between the second panel pressing portion and the eaves cover prevents the upper holder from being inclined so as to be lowered to the eaves side when the bolt is fastened to the first screwed groove.

Presence of the eaves cover makes an outer appearance when the end portion securing tool on which no panel member is placed on the second placement surface is seen from the eaves side preferable. When all of the plurality of securing tools include the second walls, the securing tools of a single configuration can be employed without distinguishing the securing tool at the intermediate position, which holds the two panel members at both sides, and the end portion securing tool.

In the panel member securing structure in the aspect of the present invention, instead of the above-described configuration, the configuration in which "the plurality of securing tools are arranged in parallel while making a direction toward the first placement surfaces from the second placement surfaces be identical to an eaves-ridge direction toward ridge from eaves on the roof face or a lateral direction orthogonal to the eaves-ridge direction, an end portion securing tool arranged on an end portion among the plurality of securing tools arranged in parallel in the eaves-ridge direction or the lateral direction has a second wall standing from a boundary between the center portion and the second placement surface in the lower holder and has an end portion upper holder instead of the upper holder, the end portion upper holder has a second flat plate portion in which a bolt hole portion and a tool hole portion are penetratingly provided, an end portion panel pressing portion that extends from the second flat plate portion in the same direction as the first placement surface, and a second hanging wall that downwardly extends from an end portion of the second flat plate portion at the second placement surface side, the panel member is held between the first placement surface and the end portion panel pressing portion, and the second hanging wall is along the second wall outside without abutting against the second placement surface" can be employed.

This securing structure is employed when the plurality of panel members are mounted using the plurality of securing tools arranged in parallel while making the direction toward the first placement surfaces from the second placement surfaces be identical to the eaves-ridge direction or the lateral direction orthogonal to the eaves-ridge direction. In the securing structure, the securing tool on the end portion from which mounting in one direction is started holds the panel member only at the first placement surface side. Therefore, this securing structure is the same as the above-described structure in the point that the end portion securing tool at the starting end of the mounting includes the second wall to thereby prevent the upper holder (end portion upper holder) from being inclined. This securing structure is different from the above-described securing structure in the point that the end portion securing tool includes the end portion upper holder instead of the upper holder. The end portion upper holder has the second flat plate portion and the end portion panel pressing portion having the same configurations as those of the flat plate portion and the first panel pressing portion of the upper holder, respectively, but has no configuration corresponding to the second panel pressing portion and instead, has the second hanging wall that downwardly extends from the end portion of the second flat plate portion at the second placement surface side.

The second hanging wall is along the second wall outside without abutting against the second placement surface. Accordingly, when the bolt penetrating through the end portion upper holder is fastened to the first screwed groove in the state in which the panel member is placed only on the first placement surface, the second hanging wall abuts against the second wall from outside to thereby prevent the end portion upper holder from being inclined so as to be lowered toward the second placement surface.

Further, the second hanging wall of the upper holder is along the outside of the second wall of the lower holder, so that when the plurality of securing tools are arranged in parallel in the eaves-ridge direction, a space above the lower holder is covered from the eaves side. Therefore, an outer appearance when the end portion securing tool on which no panel member is placed on the second placement surface is seen from the eaves side is made preferable even without using the eaves cover.

In the panel member securing structure in the aspect of the present invention, in addition to the above-described configuration in which the end portion securing tool includes the end portion upper holder, the configuration in which "the end portion upper holder has a third hanging wall downwardly extending from the second flat plate portion so as to be spaced from the second hanging wall at the eaves side relative to the second hanging wall" can be employed.

This securing structure is the same as the above-described structure in the point that the abutment between the second hanging wall and the second wall prevents the end portion upper holder from being inclined when the bolt is fastened to the first screwed groove. A part of the eaves cover can be held in a space between the second hanging wall and the third hanging wall. Accordingly, the end portion securing tool that is used for the securing structure having this configuration can also be used when the eaves cover is held or is not held.

A panel member securing tool (hereinafter, simply referred to as a "securing tool" in some cases) according to another aspect of the present invention "is a panel member securing tool including a stand, a lower holder that moves up and down along the stand, an upper holder for holding the panel member together with the lower holder, and a shaft that has an external thread formed on an outer circumferential surface, wherein the stand has a pair of side wall portions and holds the shaft between the side wall portions in a state of restricting movement of the shaft in an axial direction, the shaft is exposed from the stand in a radial direction of the external thread and has a tool engagement portion on an end portion, the lower holder has a center portion in which a cylindrical portion through which the stand is inserted is penetratingly provided, a first screwed groove which is formed at such a position as not to interfere with the cylindrical portion in the center portion, a second screwed groove which is formed on an inner circumferential surface of the cylindrical portion, and a first placement surface and a second placement surface which extend in directions orthogonal to an axial direction of the cylindrical portion at both of outer sides of the center portion, the upper holder has a flat plate portion in which a bolt hole portion and a tool hole portion are penetratingly provided, a first panel pressing portion which extends from the flat plate portion in the same direction as the first placement surface, and a second panel pressing portion which extends from the flat plate portion in the same direction as the second placement surface, a bolt inserted through the bolt hole portion is screwed with the first screwed groove, a portion of the external thread, which is exposed from the stand, and the second screwed groove are screwed with each other, and the tool hole portion is located on an extended line of a center axis of the shaft and a hole portion or a space is formed in the stand on the extended line between the shaft and the tool hole portion" can be employed.

The securing tool having this configuration is used for the above-described securing structure. The above-described securing structure is constructed by fastening a base member onto a roof and securing at least one panel member onto the base member using the securing tool having this configuration, so that the above-described action effects are exerted.

As described above, the present invention can provide a panel member securing structure that can adjust a height of a panel member in a state of holding the panel member with a securing tool and is mounted on a roof face in a state in which the panel member is held stably, and a panel member securing tool that is used for the securing structure.

BRIEF DESCRIPTION OF THE DRAWINGS

FIGS. 6A and 6B are views for explaining holding of a panel member between an upper holder and the lower holder of the securing tool in FIG. 1A by an end view cut along line Y-Y;

DESCRIPTION OF THE EMBODIMENTS

Figure 1A:
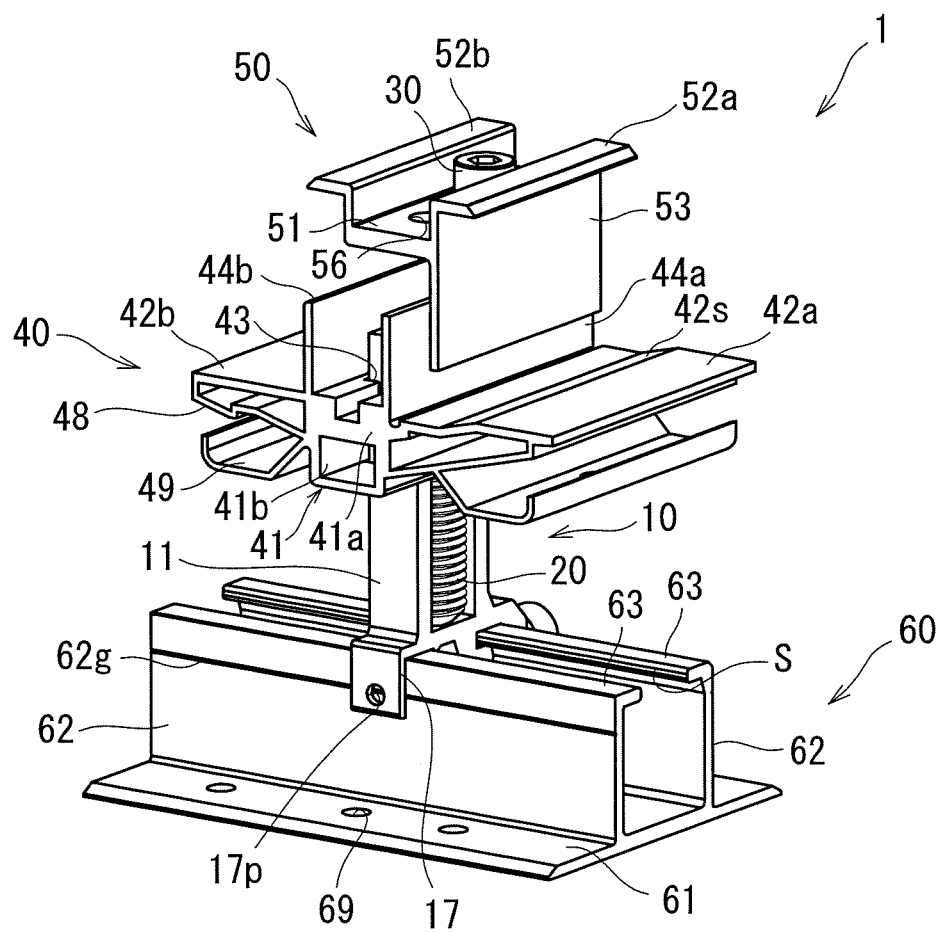
FIG. 1A is a perspective view of a state in which a securing tool according to one embodiment of the present invention is secured to a base member and FIG. 1B is a perspective view when the state in FIG. 1A is seen from the rear side.
Figure 1B:
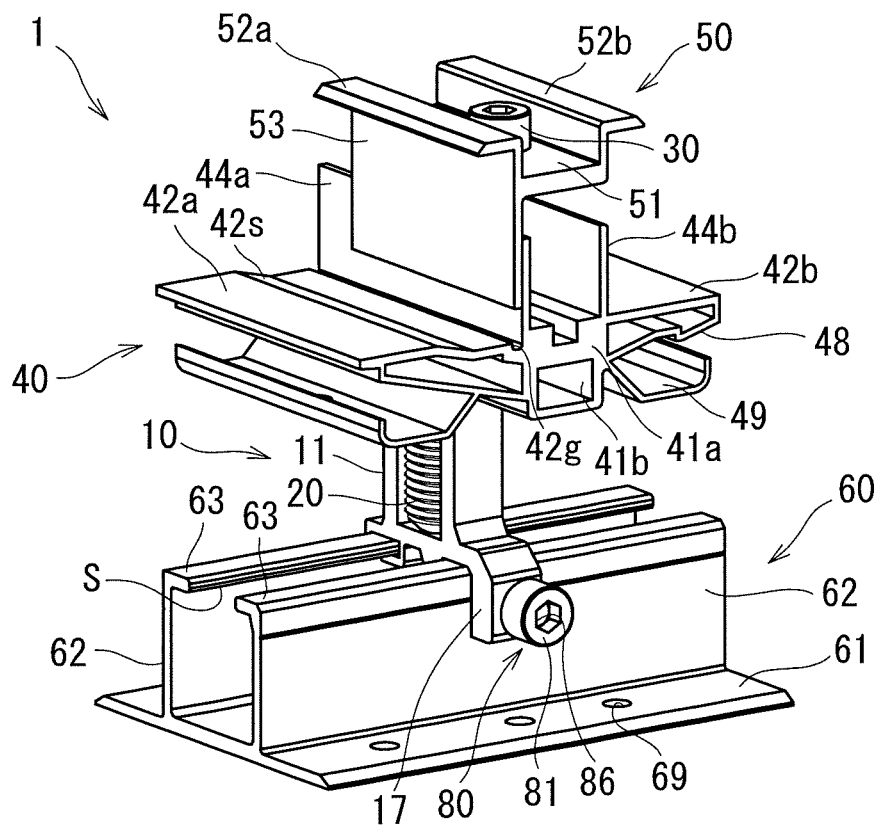
Figure 2:
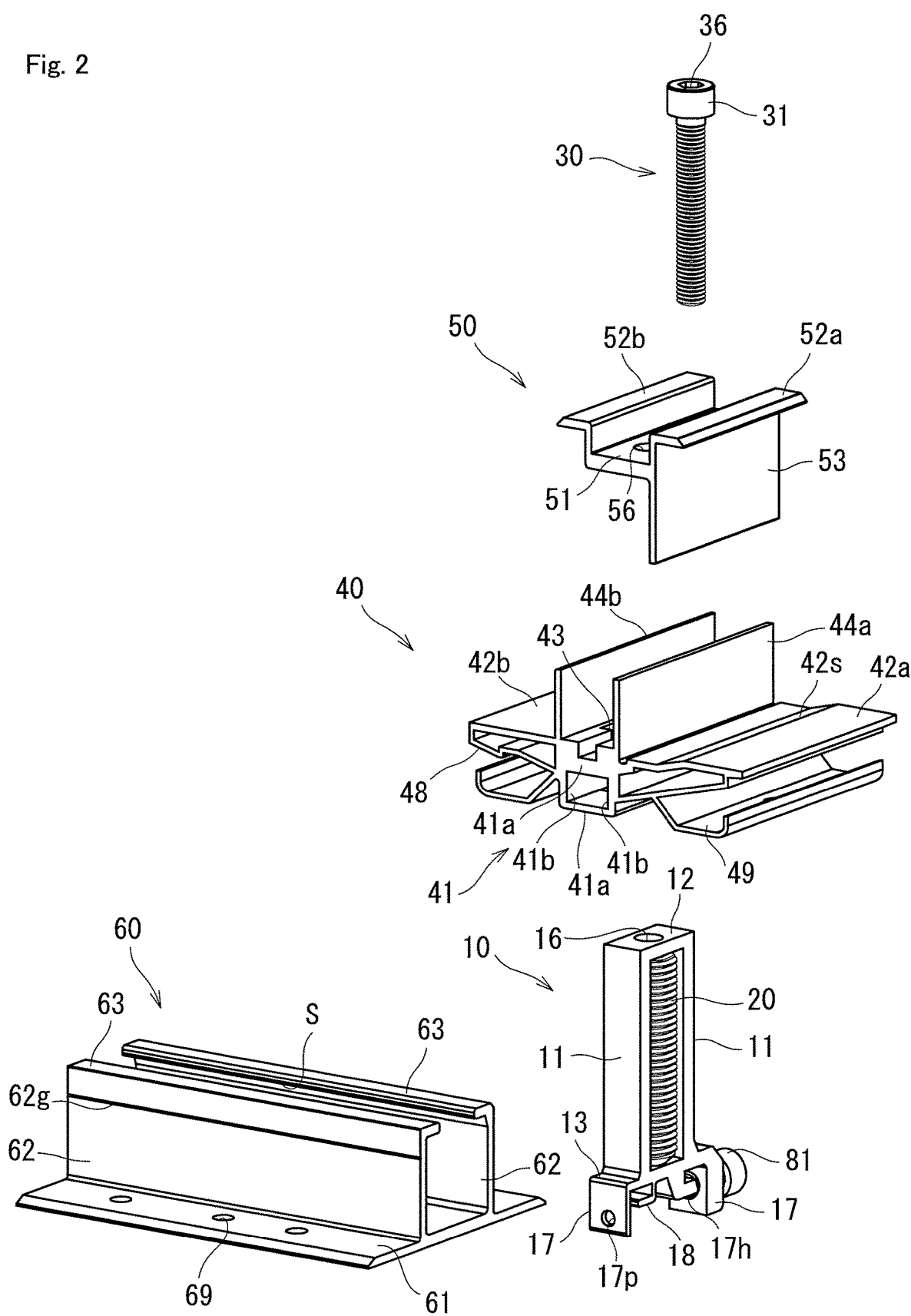
FIG. 2 is an exploded perspective view illustrating the securing tool in FIG. 1A together with the base member.
Figure 3:
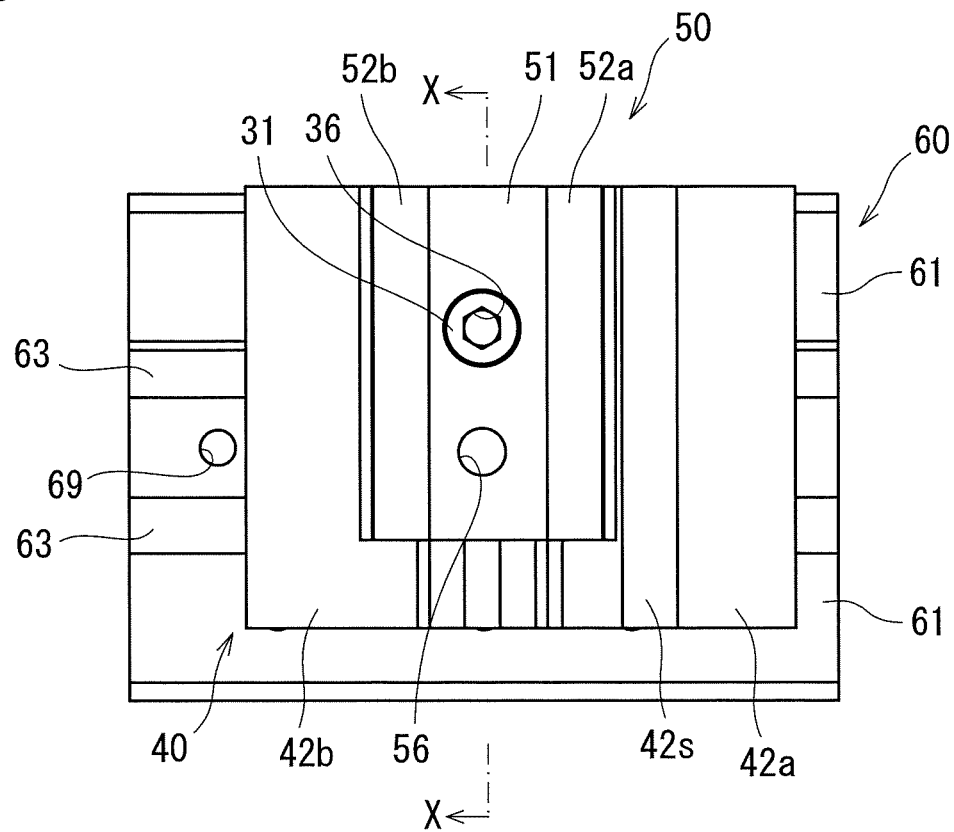
FIG. 3 is a plan view illustrating the state in which the securing tool in FIG. 1A is secured to the base member.
Figure 4:
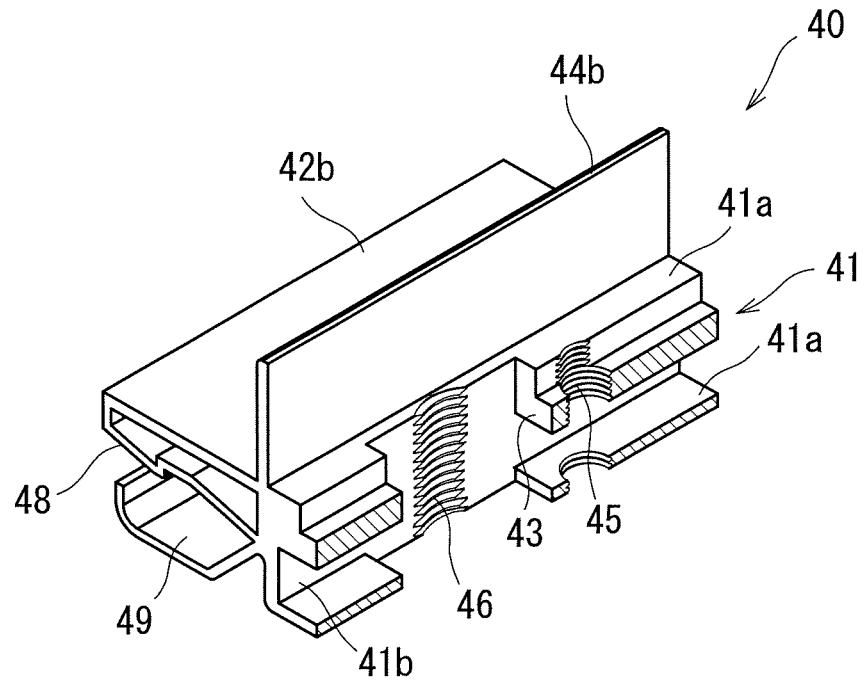
FIG. 4 is a perspective view when a lower holder of the securing tool in FIG. 1A is cut along line X-X.
Figure 5:
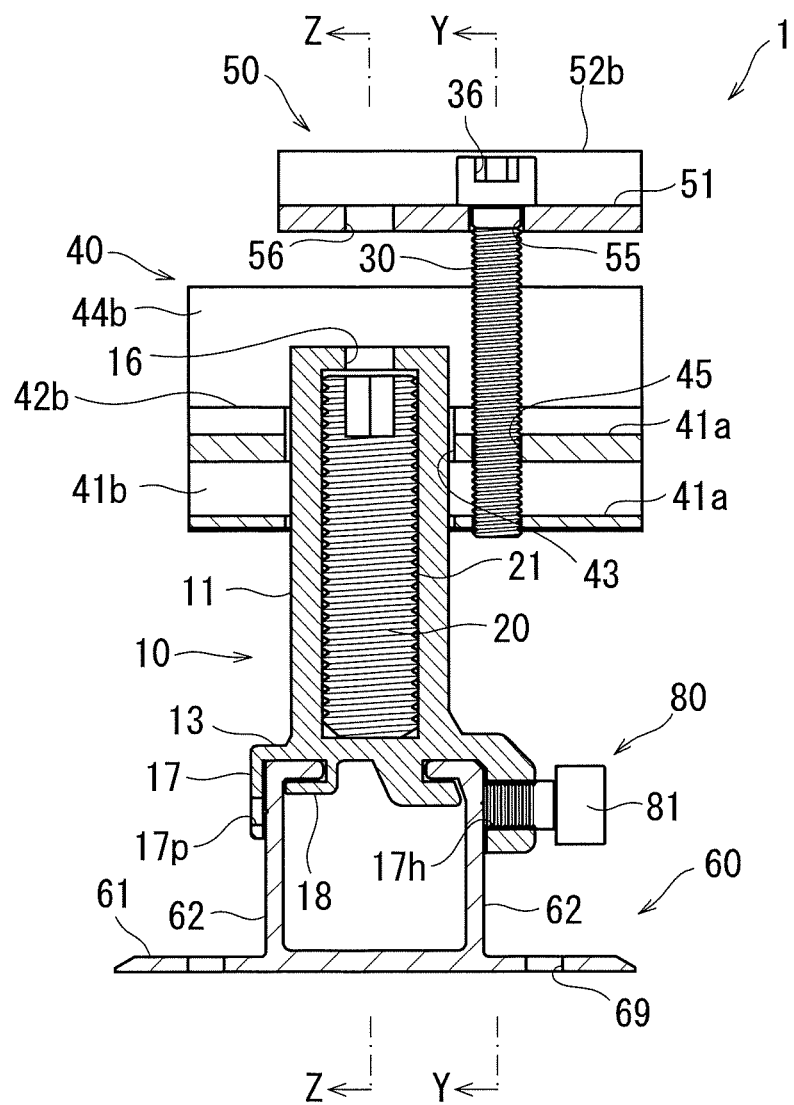
FIG. 5 is a cross-sectional view cut along line X-X in the state in which the securing tool in FIG. 1A is secured to the base member.
Figure 7A:
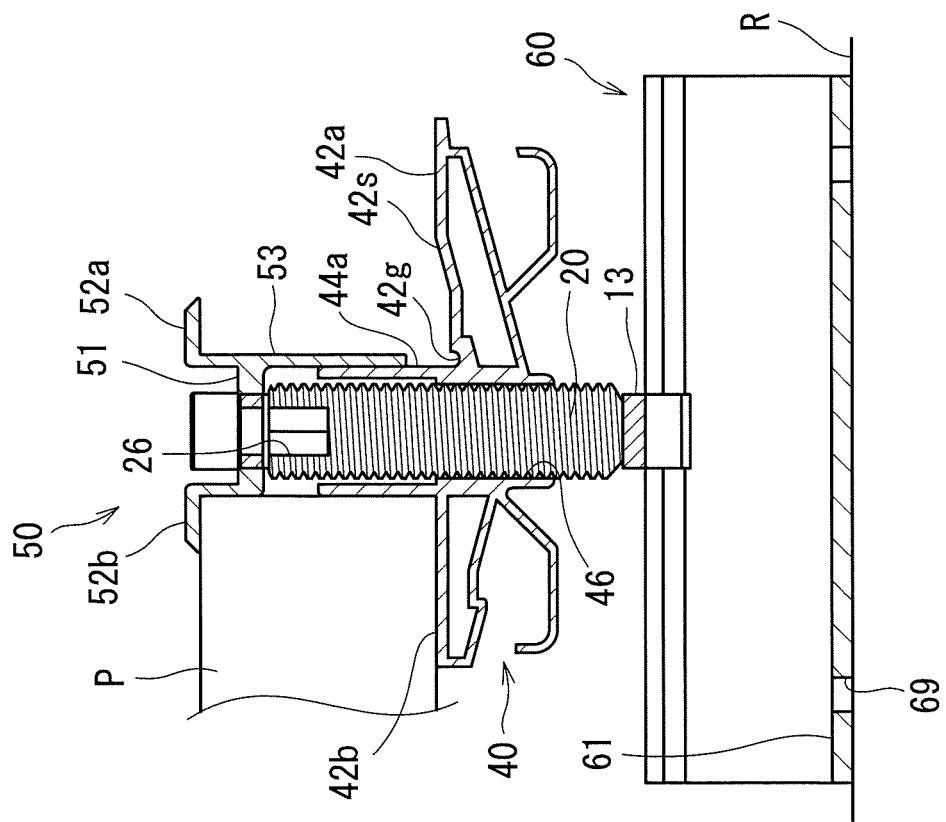
FIGS. 7A and 7B are views for explaining height adjustment of the panel member with the securing tool in FIG. 1A by a cross-sectional view cut along line Z-Z.
Figure 7B:
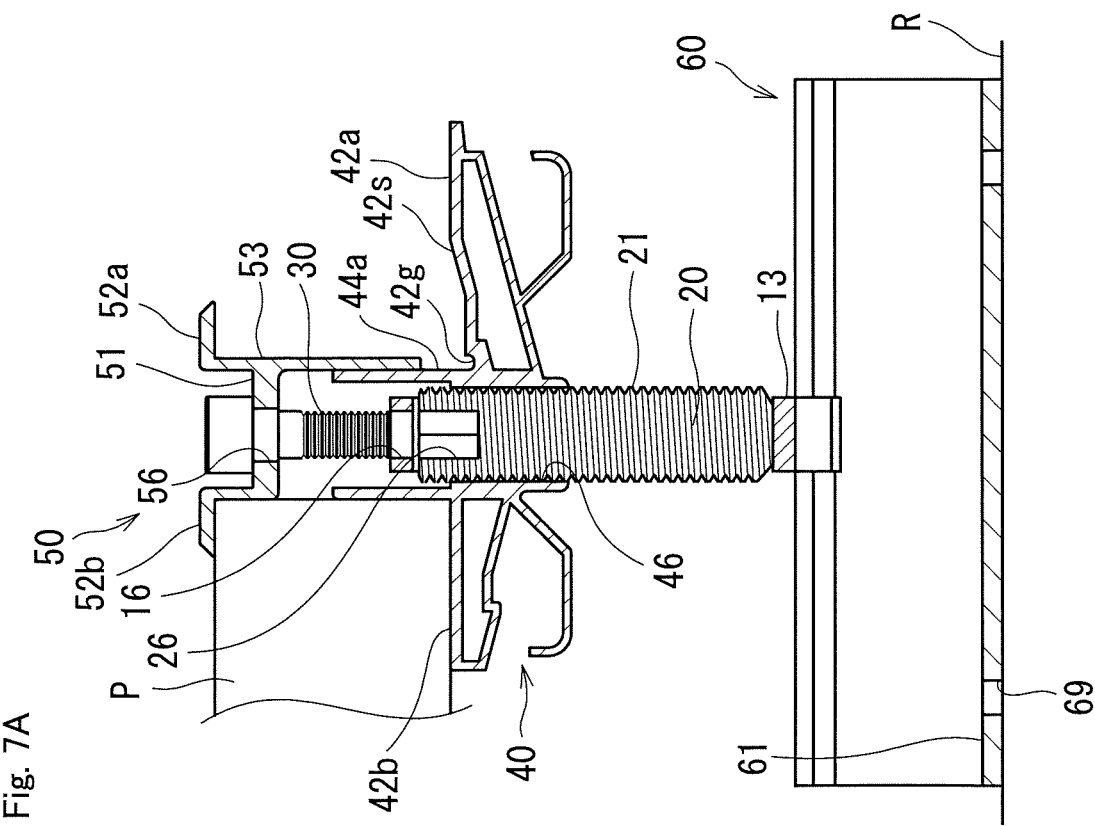
Figure 8:
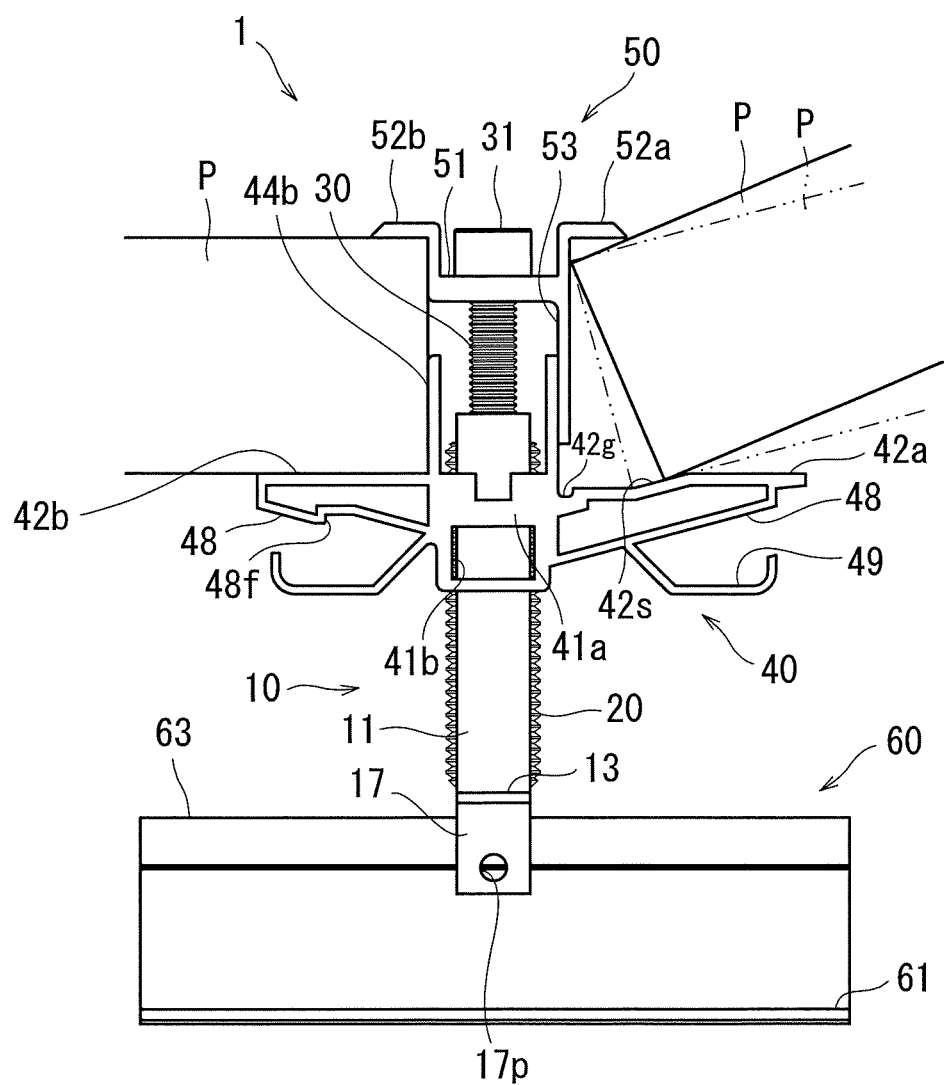
FIG. 8 is a view for explaining the case in which after holding and height adjustment of the panel member at the eaves side on the securing tool in FIG. 1A are finished, the panel member at the ridge side is held.

Hereinafter, a securing structure as a specific embodiment of the present invention, a securing tool that is used for the securing structure, and a base member that is used together with the securing tool will be described with reference to the drawings. First, a securing tool 1 and a base member 60 that is used together with the securing tool 1 will be described with reference to FIGS. 1A to 8.

The base member 60 includes a flat plate-like base surface 61, a pair of standing wall portions 62 that stands from the base surface 61, and a pair of lip pieces 63 that extends inward from the respective upper end sides of the pair of standing wall portions 62. The standing wall portions 62 are perpendicular to the base surface 61 and the lip pieces 63 are perpendicular to the standing wall portions 62. Accordingly, the pair of lip pieces 63 is parallel to the base surface 61. The pair of lip pieces 63 is separated from each other and a gap therebetween forms a slit S. A plurality of hole portions 69 are penetratingly provided in the base surface 61.

The securing tool 1 includes a stand 10, a lower holder 40, an upper holder 50, a shaft 20, and a bolt 30. The stand 10 includes a pair of side wall portions 11, a top surface portion 12 connecting the upper ends of the pair of side wall portions 11, and a bottom surface portion 13 connecting the lower ends of the pair of side wall portions 11. The bottom surface portion 13 extends outward from the pair of side wall portions 11, and locking pieces 17 extend to the opposite side to the side wall portions 11 from both ends of the bottom surface portion 13. A pair of guiding pieces 18 projects from the bottom surface portion 13 in the same direction as the locking pieces 17 at the inner side relative to the locking pieces 17. A distance between one of the locking pieces 17 and the guiding piece 18 located at the same side is slightly larger than the width of each lip piece 63. A hole portion 17*h* having a screwed groove formed on the inner circumferential surface is penetratingly provided in one of the locking pieces 17, and a bolt 80 penetrates through the hole portion 17*h*. The bolt 80 has a tool engaging portion 86 that is engaged with a tool in a head 81 thereof. In this embodiment, the tool engaging portion 86 is a hexagonal recess portion that is engaged with a hexagonal wrench as the tool. A screw hole 17*p* is penetratingly provided in the other one of the locking pieces 17.

In the stand 10, the pair of side wall portions 11, the top surface portion 12, and the bottom surface portion 13 form a longitudinal frame body and the shaft 20 is held therein. The shaft 20 has a length that is substantially equal to a distance between the top surface portion 12 and the bottom surface portion 13 and is just fitted into the longitudinal frame body. An external thread 21 is formed on the outer circumferential surface of the shaft 20 over the entire length. A commercially available "headless bolt" can be used as the shaft 20. The diameter of the external thread 21 is larger than the width of the side wall portions 11. Accordingly, the external thread 21 of the shaft 20 held in the stand 10 is exposed outward from the stand 10 in the radial direction.

The shaft 20 has a tool engaging portion 26 that is engaged with a tool in the upper end thereof, that is, an end portion thereof at the top surface portion 12 side. In this embodiment, the tool engaging portion 26 is a hexagonal recess portion that is engaged with a hexagonal wrench as the tool. A tool hole portion 16 is penetratingly provided in the top surface portion 12 of the stand 10 so as to be located on an extended line of the center axis of the shaft 20.

The lower holder 40 includes a center portion 41, and a first placement surface 42*a* and a second placement surface 42*b* that extend to both of outer sides from the center portion 41, respectively. The center portion 41 is formed into a square cylindrical shape, and a cylindrical portion 43 is formed so as to penetrate through a pair of surface portions 41*a* of two pairs of surface portions 41*a* and 41*b* forming a peripheral wall of the center portion 41. A second screwed groove 46 as an internal thread that is screwed with the external thread 21 of the shaft 20 is formed on portions of the other pair of surface portions 41*b*, which form the inner circumferential surface of the cylindrical portion 43. A first screwed groove 45 is penetratingly provided in the center portion 41 so as to be separated from the cylindrical portion 43 in the direction orthogonal to the direction toward the second placement surface 42*b* from the first placement surface 42*a*. An internal thread of the first screwed groove 45 is screwed with the external thread of the bolt 30.

An axial direction of the first screwed groove 45 is parallel to the axial direction of the cylindrical portion 43 and is perpendicular to the second placement surface 42*b* having a flat plate shape. The first placement surface 42*a* is formed as a portion having the flat plate shape on the same plane as the second placement surface 42*b* to an approximately intermediate position from an outer end side to the center portion 41, and is formed as an inclination portion 42*s* that is lowered toward the center portion 41 therefrom. A flat plate-like second wall 44*b* perpendicular to the second placement surface 42*b* stands from the boundary between the second placement surface 42*b* and the center portion 41. A flat plate-like first wall 44*a* stands from the boundary between the inclination portion 42*s* of the first placement surface 42*a* and the center portion 41 in parallel to the second wall 44*b*. Further, a groove 42*g* is formed in the first placement surface 42*a* so as to be along the first wall 44*a*.

The lower holder 40 is increased in mechanical strength by connecting each of the outer end sides of the first placement surface 42*a* and the second placement surface 42*b* with the surface portions 41*b* of the center portion 41 by ribs 48. In the lower holder 40, auxiliary placement surfaces 49 extend below the two ribs 48, respectively, while base ends thereof are the ribs 48 or the center portion 41. Wire materials such as electric wires for supplying electricity to solar cells when the panel member P is a solar cell module or pipes circulating water or warm water when the panel member P is a solar water heater can be placed on these auxiliary placement surfaces 49.

The rib 48 at the second placement surface 42*b* side is gradually separated from the second placement surface 42*b* toward the center portion 41 from a connecting portion to the second placement surface 42*b*, and then, has a hook 48*f* having a shape that is non-continuously bent toward the second placement surface 42*b*.

The upper holder 50 has a flat plate portion 51, and a first panel pressing portion 52*a* and a second panel pressing portion 52*b* that extend to both of the outer sides from the flat plate portion 51, respectively. In this embodiment, the first panel pressing portion 52*a* and the second panel pressing portion 52*b* are perpendicularly erected from the end sides of the flat plate portion 51, and then, are perpendicularly bent outward with the same height. Alternatively, the first panel pressing portion and the second panel pressing portion may be on the same plane as the flat plate portion 51. The upper holder 50 has a hanging wall 53 downwardly extending perpendicularly to the flat plate portion 51 from the boundary between the first panel pressing portion 52*a* and the flat plate portion 51.

A bolt hole portion 55 and a tool hole portion 56 are penetratingly provided in the flat plate portion 51 of the upper holder 50. Of them, the tool hole portion 56 is a hole into which the tool that is engaged with the tool engagement portion 26 of the shaft 20 through the tool hole portion 16 formed in the stand 10 is inserted. On the other hand, the bolt hole portion 55 is a hole into which the bolt 30 that is screwed with the first screwed groove 45 is inserted. The bolt 30 is provided with a head 31 and has, in the head 31, a tool engaging portion 36 that is engaged with a tool. In this embodiment, the tool engaging portion 36 is a hexagonal recess portion that is engaged with a hexagonal wrench as the tool.

When the tool engagement portion 36 of the bolt 30, the tool engagement portion 26 of the shaft 20, and the tool engagement portion 86 of the bolt 80 are hexagonal recess portions having the same size, all of the bolt 30, the shaft 20, and the bolt 80 can be rotated using a common tool.

Each of the base members 60, the stands 10, the lower holders 40, and the upper holders 50 having the above-described configurations can be easily manufactured by forming a member having a constant cross section orthogonal to an extrusion direction by extrusion molding of a metal material such as aluminum, and then, performing processing of forming the hole portions and/or the screwed grooves therein.

Next, mounting of the panel members P on a roof face R using the securing tools 1 and the base members 60 having the above-described configurations will be described. The plurality of panel members P are arranged in parallel in the eaves-ridge direction on the roof face R, as an example.

First, mounting of the base member 60 on the roof face R is described. At this time, the base member 60 can be fastened to the roof face R with screws or nails inserted through the hole portions 69 that are penetratingly provided in the base surface 61. The base member 60 is oriented such that the direction of the slit S is identical to the eaves-ridge direction of the roof face R. It should be noted that rainwater is prevented from flowing down the screws or nails and entering a space under the roof by interposing a waterproofing sheet (not illustrated) such as butyl rubber between the base surface 61 and the roof face R.

In the securing tool 1, an upper portion of the stand 10 is inserted through the cylindrical portion 43 of the lower holder 40 from below, and a portion of the external thread 21 of the shaft 20, which is exposed from the stand 10, is screwed with the second screwed groove 46 of the lower holder 40. The upper holder 50 may be temporarily fastened to the lower holder 40 by screwing, with the first screwed groove 45 of the lower holder 40, the lower end of the bolt 30 inserted through the bolt hole portion 55 from above the upper holder 50.

The securing tool 1 is mounted on the base member 60 by placing the bottom surface portion 13 of the stand 10 on the pair of lip pieces 63 of the base member 60. Then, one of the lip pieces 63 is located between the locking piece 17 and the guiding piece 18 at the same side in the pair of locking pieces 17 and the pair of guiding pieces 18 of the stand 10. In this state, the position of the securing tool 1 on the roof face R can be adjusted by sliding the stand 10 along the slit S. In a state in which the locking piece 17 having no hole portion 17h for the bolt 80 is made to abut against the standing wall portion 62 of the base member 60, the bolt 80 inserted through the hole portion 17h of the other locking piece 17 is advanced to press the front end of the bolt 80 against the standing wall portion 62. The securing tool 1 is thus secured to the base member 60 with friction force between the bolt 80 and the standing wall portion 62. The stand 10 placed on the lip pieces 63 becomes perpendicular to the base surface 61 because the base surface 61 and the lip pieces 63 are parallel to each other. Accordingly, the stand 10 and the shaft 20 stand perpendicularly to the roof face R.

The locking piece 17 having no hole portion 17h has the screw hole 17p. Therefore, securing the stand 10 to the base member 60 becomes firm by fastening a tapping screw (not illustrated) inserted through the screw hole 17p to the standing wall portion 62. A groove 62g for positioning the tapping screw is formed in the surface of the standing wall portion 62 to which the tapping screw is fastened. Securing the bolt 80 with the friction force becomes more firm by forming the similar groove 62g on the other standing wall portion 62 as well and causing the groove 62g to receive the front end of the bolt 80.

When the plurality of securing tools 1 having both of the hole portions 17h and the screw holes 17p are secured to the base members 60, all of the securing tools 1 are not necessarily required to be secured to the base members 60 with both of the bolts 80 inserted through the hole portions 17h and the tapping screws inserted through the screw holes 17p. Both or one of the securing with the bolts 80 inserted through the hole portions 17h and the securing with the tapping screws inserted through the screw holes 17p can be selected in consideration of whether the roof face R on which the panel members P are mounted is present under an environment of a strong-wind area, a heavy snowfall area, or the like.

When the stand 10 is mounted on the base member 60, the lower holder 40 is also made into a state of being mounted on the base member 60 with the stand 10 interposed therebetween. This state is established because the second screwed groove 46 in the cylindrical portion 43 and the external thread 21 of the shaft 20 held in the stand 10 are screwed with each other in the state in which the upper portion of the stand 10 is inserted through the cylindrical portion 43 of the lower holder 40. The stand 10 is mounted on the base member 60 with such an orientation that the second placement surface 42b of the lower holder 40 is at the eaves side and the first placement surface 42a is at the ridge side.

The securing tool 1 enables height adjustment in a state in which the panel member(s) P is(are) placed on the lower holder 40. To be specific, the securing tool 1 enables both of construction (1) of placing the panel member(s) P on the lower holder 40, performing height adjustment of the panel member(s) P by moving up and down the lower holder 40, and then, holding the panel members(s) P between the upper holder 50 and the lower holder 40 by fastening the bolt 30, and construction (2) of placing the panel member(s) P on the lower holder 40, holding the panel members(s) P between the upper holder 50 and the lower holder 40 by fastening the bolt 30, and then, performing height adjustment of the panel member(s) P by moving up and down the lower holder 40. The above-described constructions can be available because the first screwed groove 45 to which the bolt 30 is fastened is formed in the lower holder 40.

In addition, the securing tool 1 enables both of construction (3) of performing the construction (1) or the construction (2) in a state in which the panel members P are placed on both of the first placement surface 42a and the second placement surface 42b of the lower holder 40, and construction (4) of performing the construction (1) or the construction (2) in a state in which the panel member P is placed on only one of the first placement surface 42a and the second placement surface 42b of the lower holder 40, and then, holding the panel members P between the upper holder 50 and the lower holder 40 while placing the panel member P on the other one of the first placement surface 42a and the second placement surface 42b. The above-described constructions can be available because both of the second screwed groove 46 that is engaged with the external thread 21 for moving up and down the lower holder 40 relative to the stand 10 and the first screwed groove 45 to which the bolt 30 is fastened for holding the panel members P are formed in the center portion 41 of the lower holder 40 and give no influence on the placement of the panel members P on the first placement surface 42a and the second placement surface 42b at the outer sides of the center portion 41.

As operations constituting the above-described constructions (1) to (4) are individually described, when the panel member P is placed on the second placement surface 42b, the panel member P can be easily positioned by causing the end side of the panel member P at the ridge side to abut against the second wall 44b standing in the lower holder 40. In the same manner, when the panel member P is placed on the first placement surface 42a, the panel member P can be easily positioned by causing the end side of the panel member P at the eaves side to abut against the first wall 44a standing in the lower holder 40.

When the lower holder 40 is moved up and down relative to the stand 10 for adjusting the height(s) of the panel member(s) P, the tool inserted through the tool hole portion 56 of the upper holder 50 and the tool hole portion 16 of the stand 10 is engaged with the tool engagement portion 26 of the shaft 20 to rotate the shaft 20. Since the stand 10 inhibits the movement of the shaft 20 in the axial direction, the lower holder 40 having the second screwed groove 46 that is engaged with the external thread 21 of the shaft 20 is moved up and down with the rotation of the shaft 20.

When the panel member(s) P placed on the lower holder 40 is(are) held between the upper holder 50 and the lower holder 40, the bolt 30 inserted through the bolt hole portion 55 from above the upper holder 50 is screwed with and fastened to the first screwed groove 45 of the lower holder 40. The head 31 of the bolt 30 is thereby pressed against the flat plate portion 51 of the upper holder 50 and the bolt 30 presses down the upper holder 50. As a result, force that the upper holder 50 presses the panel member(s) P toward the lower holder 40 acts and the panel member(s) P is(are) firmly held between the upper holder 50 and the lower holder 40.

Next, construction of securing the plurality of panel members P to the roof face R with the plurality of securing tools 1 in order in one direction toward the ridge from the eaves in the eaves-ridge direction will be described. This construction corresponds to the above-described construction (4) involving the construction (2). Such construction of securing in one direction has an advantage that the height adjustment can be performed without requiring an operator to get on the panel member P even when the panel member P is large in size.

In the securing tool 1 at the intermediate position on the roof face excluding the eaves end and the ridge end, the bolt 30 inserted through the bolt hole portion 55 from above the upper holder 50 is screwed with and fastened to the first screwed groove 45 of the lower holder 40 in the state in which the panel member P is placed on the second placement surface 42b of the lower holder 40. In this step, no panel member P is placed on the first placement surface 42a. Therefore, when the second panel pressing portion 52b of the upper holder 50 abuts against the upper surface of the panel member P, the upper holder 50 is possibly inclined such that the first panel pressing portion 52a becomes close to the first placement surface 42a with fastening of the bolt 30. For avoiding this risk, the upper holder 50 has the hanging wall 53 downwardly extending from the boundary between the flat plate portion 51 and the first panel pressing portion 52a, and the hanging wall 53 is along the first wall 44a outside without abutting against the first placement surface 42a (see FIG. 6A). Therefore, when the bolt 30 is fastened, the hanging wall 53 abuts against the first wall 44a from outside to thereby prevent the upper holder 50 from being inclined so as to be lowered toward the first placement surface 42a. The force that the second panel pressing portion 52b presses the panel member P toward the second panel pressing portion 42b acts without inclination of the upper holder 50, so that the panel member P is firmly held between the upper holder 50 and the lower holder 40 (see FIG. 6B).

The hanging wall 53 of the upper holder 50 is set to have such length that it does not abut against the first placement surface 42a in a height range of the panel members P as mounting targets by the securing tool 1. To be specific, the height range of the panel members P as the mounting targets by the securing tool 1 is 32 mm to 46 mm. When the panel member P having the maximum height is held between the upper holder 50 and the lower holder 40, the hanging wall 53 covers an upper portion of the first wall 44a for the length of 5 mm to 10 mm. In addition, when the panel member P having the minimum height is held between the upper holder 50 and the lower holder 40, the hanging wall 53 is inserted into the groove 42g of the first placement surface 42a and a gap of 2 mm to 5 mm exists between a bottom portion of the groove 42g and the lower end of the hanging wall 53.

In this manner, in the securing tool 1, the hanging wall 53 extends toward the lower holder 40 from the upper holder 50 but does not abut against the first placement surface 42a, and the upper holder 50 does not have any other configuration abutting against the first placement surface 42a and the second placement surface 42b. Therefore, a distance between the second panel pressing portion 52b and the second placement surface 42b can be changed with advancement and retreat of the bolt 30 relative to the first screwed groove 45, so that a large number of types of the panel members P having different heights can be secured to the base members 60 using the single type of the securing tools 1.

The upper holder 50 having the hanging wall 53 has a shape similar to that of the upper bracket in Patent Document No. 2 (US Patent Application Publication No. 2017/0040931) described above as the conventional technique. However, as described above, the hanging wall is made to stand on the lower bracket in Patent Document No. 2. That is to say, in the securing tool Patent Document No. 2, the upper bracket is rotated about, as a fulcrum, the lower end of the hanging wall to press the panel at only one side of the upper bracket with fastening of the bolt. Accordingly, the upper holder 50 in the embodiment, which has the hanging wall 53 abutting neither of the first placement surface 42a nor the second placement surface 42b, is largely different from the upper bracket Patent Document No. 2 in operations and functions.

In order to perform the height adjustment of the panel member P at the eaves side in the state in which the panel member P is held between the upper holder 50 and the lower holder 40 by fastening the bolt 30, the tool inserted through the tool hole portion 56 of the upper holder 50 and the tool hole portion 16 of the stand 10 is engaged with the tool engagement portion 26 of the shaft 20 to rotate the shaft 20. Since the stand 10 inhibits the movement of the shaft 20 in the axial direction, the lower holder 40 having the second screwed groove 46 that is engaged with the external thread 21 of the shaft 20 is moved up and down with the rotation of the shaft 20 (see FIGS. 7A and 7B).

Thus, after the holding and height adjustment of the panel member P at the eaves side are finished, the next panel member P is held at the ridge side of the same securing tool 1. Only the gap that is just equal to the height of the panel member P is formed between the first panel pressing portion 52a having the same height as that of the second panel pressing portion 52b and the first placement surface 42a having the same height as that of the second placement surface 42b because the bolt 30 has been fastened to the first screwed groove 45 for holding the panel member P at the eaves side. The first placement surface 42a has however the inclination portion 42s that is lowered toward the first wall 44a from the substantially intermediate position of the distance from the boundary between the first placement surface 42a and the center portion 41 to the end side at the ridge side. Accordingly, as indicated by a solid line and a dashed-two dotted line in FIG. 8, the panel member P can be fitted into the space between the first panel pressing portion 52a and the first placement surface 42a by inclining the panel member P to be higher toward the ridge side and making an end portion at the eaves side close to the center portion 41 while sliding it along the inclination portion 42s.

The panel member P is held between the upper holder 50 and the lower holder 40 at the ridge side of the securing tool 1, and one securing tool 1 is thereby made into a state of holding the two panel members P that are adjacently arranged on the roof face R.

Thereafter, a ridge-side end portion of the panel member P that is held between the first panel pressing portion 52a and the first placement surface 42a is held between the second panel pressing portion 52b and the second placement surface 42b of another securing tool 1, and height adjustment is performed. These operations are equal to the operations described above with reference to FIGS. 6A, 6B, 7A and 7B. After that, the next panel member P is fitted into the space between the first panel pressing portion 52a and the first placement surface 42a in the same manner as the operation described above with reference to FIG. 8. Subsequently, the plurality of panel members P can be mounted in order in one direction toward the ridge from the eaves on the roof face R by repeating the same operations.

In the securing structure in the embodiment, as both of an end portion securing tool closest to the ridge and an end portion securing tool closest to the eaves among the plurality of securing tools mounting the plurality of panel members P on the roof face R in the direction toward the ridge from the eaves, securing tools having the same configuration are used as that of the above-described securing tool 1 which holds the panel members P at both sides thereof at the intermediate position between the ridge end and the eaves end.

The securing tool 1 as the end portion securing tool at the ridge side holds the panel member P between the second panel pressing portion 52b and the second placement surface 42b but holds no panel member P between the first panel pressing portion 52a and the first placement surface 42a. However, as described above, when the bolt 30 is fastened to the first screwed groove 45, the hanging wall 53 abuts against the first wall 44a from the outside to thereby prevent the upper holder 50 from being inclined. The panel member P can therefore be firmly held between the upper holder 50 and the lower holder 40.

Figure 9A:
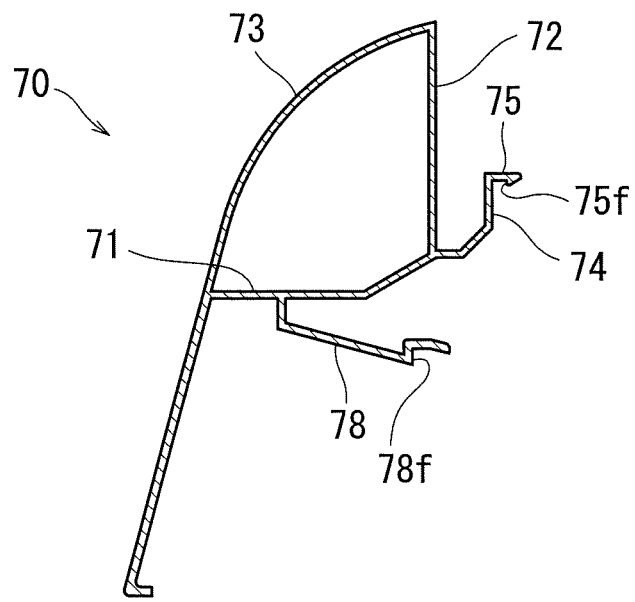
FIG. 9A is a cross-sectional view of an eaves cover that is used together with the securing tool in FIG. 1A
Figure 9B:
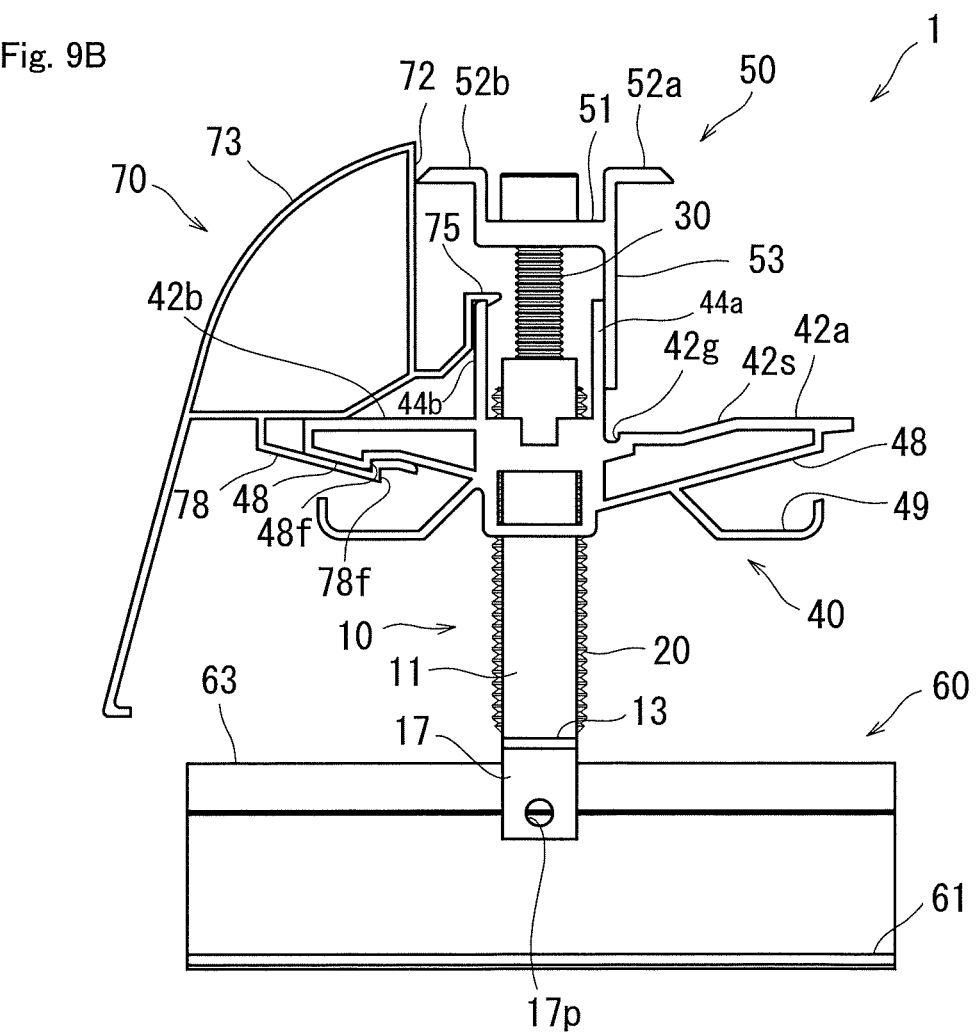
FIG. 9B is a front view in a state in which the eaves cover in FIG. 9A is held on the securing tool in FIG. 1A.

On the other hand, the securing tool 1 as the end portion securing tool at the eaves side holds the panel member P between the first panel pressing portion 52a and the first placement surface 42a but holds no panel member P between the second panel pressing portion 52b and the second placement surface 42b. In the securing structure in the embodiment, the securing tool 1 as the end portion securing tool is made to hold an eaves cover 70 at the eaves side, so that an outer appearance when seen from the eaves side is made preferable. The eaves cover 70 has a constant cross-sectional shape illustrated in FIG. 9A, which is orthogonal to the lengthwise direction, and the length thereof is the same as the length of the panel member P in the lateral direction (length in the direction orthogonal to the eaves-ridge direction).

To be specific, the eaves cover 70 includes a flat plate-like cover base 71, a cover standing wall 72 that is erected upward from one end side of the cover base 71, a covering portion 73 that connects the upper end side of the cover standing wall 72 and the other end side of the cover base 71 and further extends to the lower side of the cover base 71, a locking wall 74 that extends from the vicinity of the lower end of the cover standing wall 72 in the direction opposite to the covering portion 73, and a fitting arm 78 that extends below the cover standing wall 72 from an intermediate position of the cover base 71.

The locking wall 74 extends so as to be farther from the cover standing wall 72, and then, extends to the height lower than the cover standing wall 72 in substantially parallel to the cover standing wall 72. The upper end of the locking wall 74 is a locking portion 75 bent perpendicularly so as to be farther from the cover standing wall 72, and a hook 75f bent downward in a claw-like form is formed on the front end of the locking portion 75. The height to the locking portion 75 from the cover base 71 is substantially the same as the height to the upper end of the second wall 44b from the second placement surface 42b in the securing tool 1.

The fitting arm 78 shortly extends perpendicularly to the cover base 71, and then, is bent toward below the cover standing wall 72, and extends such that a distance to the cover base 71 is gradually increased. The fitting arm 78 has a hook 78f bent toward the cover standing wall 72 on the front end thereof. The shape of the portion of the fitting arm 78 in which the distance to the cover base 71 is gradually increased is substantially similar to the shape of a portion of the rib 48 at the second placement surface 42b side in the securing tool 1 in which the distance to the second placement surface 42b is gradually increased, and the size thereof is slight larger than the portion of the rib 48.

The eaves cover 70 is mounted on the securing tool 1 by making the eaves cover 70 close to the securing tool 1 from the eaves side, placing the cover base 71 on the second placement surface 42b, and inserting the second placement surface 42b and the rib 48 of the securing tool 1 into the space between the cover base 71 and the fitting arm 78. When the second placement surface 42b and the rib 48 are inserted so as to enlarge the space between the cover base 71 and the fitting arm 78 with elastic deformation of the fitting arm 78 and the hook 78f of the fitting arm 78 advances beyond the hook 48f of the rib 48, the hook 78f is caught by the hook 48f with elastic restoration of the fitting arm 78. At the same time, the locking portion 75 of the eaves cover 70 is caught on the upper end of the second wall 44b of the securing tool 1 from the eaves side, and the hook 75f having the downward claw shape prevents the locking portion 75 from being detached from the second wall 44b. As described above, the eaves cover 70 is fitted into the securing tool 1 from the eaves side using the elastic deformation thereof, and can therefore be easily mounted on the securing tool 1 without using no screw and the like.

In the state in which the securing tool 1 as the end portion securing tool at the eaves side holds, at the first placement surface 42a side, the panel member P in the height range of the mounting targets, the cover standing wall 72 of the eaves cover 70 stands from the cover base 71 at the eaves side relative to the second panel pressing portion 52b with the height higher than the second panel pressing portion 52b of the securing tool 1. Accordingly, in the securing tool 1 on which no panel member P is placed at the eaves side, abutment between the second panel pressing portion 52b and the cover standing wall 72 prevents the upper holder 50 from being inclined so as to be lowered to the eaves side when the bolt 30 is fastened to the first screwed groove 45.

As described above, in the securing structure in the embodiment that is constructed using the securing tool 1 and the base member 60, the height adjustment of the panel member P can be performed in the state in which the panel member P is held on the securing tool 1. In particular, the first screwed groove 45 to which the bolt 30 is fastened is formed in the lower holder 40 that is moved up and down for the height adjustment. Therefore, the height adjustment of the panel member P can be performed in the state in which the panel member P is firmly held between the upper holder 50 and the lower holder 40 by fastening the bolt 30.

The securing tool 1 has the configuration in which the upper holder 50 has no portion abutting against the first placement surface 42a and the second placement surface 42b of the lower holder 40 in the state in which the panel member P is held between the upper holder 50 and the lower holder 40. Therefore, the large number of types of the panel members P having different heights can be secured to the base members 60 using the single type of the securing tools 1.

When the plurality of panel members P are mounted on the roof face R using the plurality of securing tools 1, the holding and height adjustment of the panel members P are progressed in order in one direction toward the ridge from the eaves, thereby performing the construction without requiring the operator to get on the panel members P. In this construction, even when the bolt 30 is fastened to the lower holder 40 on which the panel member P is placed at the eaves side but no panel member P is placed at the ridge side, the abutment between the hanging wall 53 and the first wall 44a prevents the upper holder 50 from being inclined so as to be lowered to the ridge side.

In the securing tool 1, the height adjustment of the panel member P is performed by rotating the external thread 21 with the tool. The second screwed groove 46 with which the external thread 21 is screwed is formed in the cylindrical portion 43 that is penetratingly provided in the lower holder 40 so as to have the length corresponding to the entire length of the cylindrical portion and the shaft 20 having the external thread 21 is formed to have the length corresponding to the substantially entire length of the stand 10. Therefore, the length of the engagement between the external thread 21 and the second screwed groove 46 can be increased and holding of the panel member P utilizing the engagement between the external thread 21 and the second screwed groove 46 can be made stable.

In addition, in the securing tool 1, the length of the shaft 20 held in the stand 10 is substantially equal to the entire length of the stand 10, and the presence of the shaft 20 increases the mechanical strength of the stand 10 in the axial direction. Since loads of the lower holder 40, the panel member P, and the upper holder 50 act on the stand 10 in the axial direction, an advantage that is provided by the increase in the mechanical strength of the stand 10 in that direction is large.

When the plurality of panel members P are mounted on the roof face R in one direction toward the ridge from the eaves, the panel member P is held at the ridge side of the securing tool 1 after the bolt 30 penetrating through the upper holder is fastened to the first screwed groove 45. Thus, only the gap equal to the height of the panel member P is formed between the first placement surface 42a and the first panel pressing portion 52a. To cope with this, the inclination portion 42s is formed on the first placement surface 42a. This inclination portion 42s enables the panel member P to be fitted into between the first placement surface 42a and the first panel pressing portion 52b by sliding the panel member P along the inclination portion 42s in the state in which the panel member P is inclined so as to be higher at the ridge side.

Further, the securing tool 1 can be used as not only the securing tool (the securing tool at the intermediate position on the roof face) holding the panel members P at both sides but also the end portion securing tools at the eaves side and the ridge side. This provides an advantage that component management related to the securing tools for constructing the securing structure is easy. Further, when the securing tool 1 that is used as the end portion securing tool is made to hold the eaves cover 70 at the eaves side, so that the outer appearance when seen from the eaves side is made preferable. The eaves cover 70 can be mounted on the securing tool 1 from the eaves side so as to be fitted with the elastic deformation. Therefore, even after the bolt 30 is fastened to the first screwed groove 45 for holding the panel member P at the ridge side, the eaves cover 70 can be easily mounted on the securing tool 1.

Figure 10A:
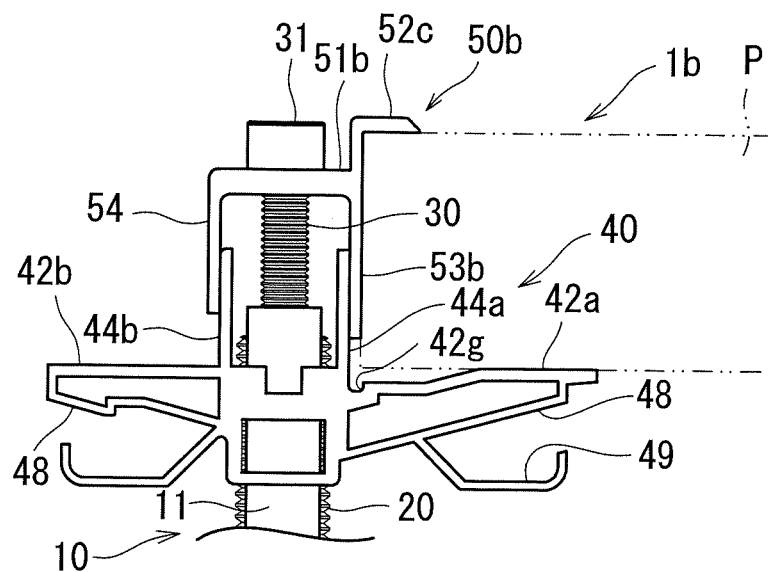
FIG. 10A is a front view for explaining an end portion upper holder.
Figure 10B:
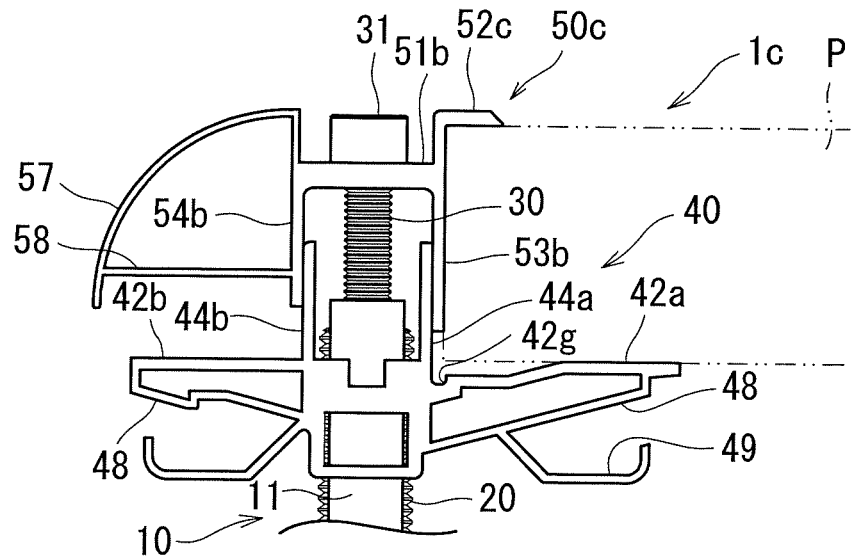
FIG. 10B is a front view for explaining an end portion upper holder in a variation.
Figure 10C:
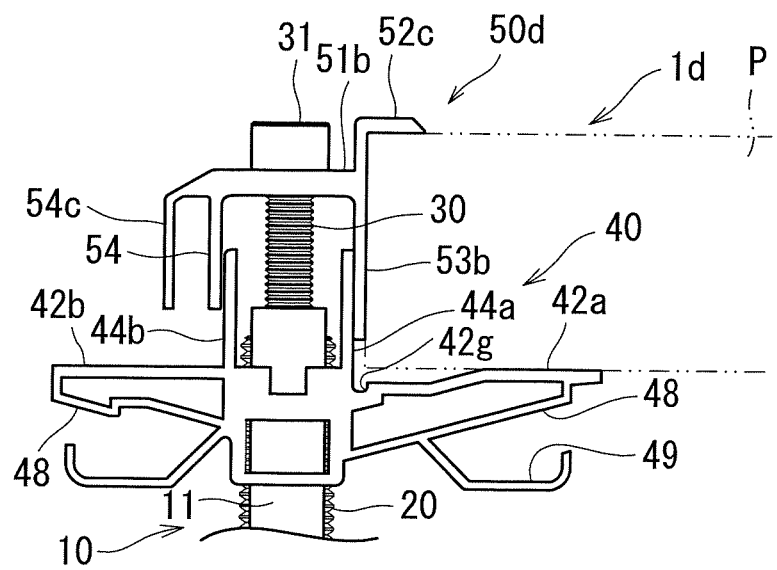
FIG. 10C is a front view for explaining an end portion upper holder in another variation.

Although in the above description, the securing tools 1 are used as the end portion securing tools as well, as an example, the invention is not limited thereto. The securing tools 1 can be used as the securing tool at the intermediate position, excluding the eaves end and the ridge end, and as the end portion securing tool at the ridge side whereas an end portion securing tool 1b, 1c, or 1d exclusive for the eaves end as illustrated in FIG. 10A, 10B, or 10C can be used in addition to the securing tools 1. The end portion securing tool 1b and the end portion securing tool 1c are used when no eaves cover is held thereon and the end portion securing tool 1d can be applicable when the eaves cover is not held or is held thereon.

The end portion securing tool 1b illustrated in FIG. 10A is different from the securing tool 1 only in the point that it includes an end portion upper holder 50b instead of the upper holder 50 and is the same as the securing tool 1 in the other configurations (the stand 10, the shaft 20, the bolt 30, and the lower holder 40). The end portion securing tool 1b is mounted on the roof face R with the above-described base member 60 interposed therebetween in the same manner as the securing tool 1.

The end portion upper holder 50b includes a second flat plate portion 51b, an end portion panel pressing portion 52c extending to the first placement surface 42a side from the second flat plate portion 51b, a hanging wall 53b downwardly extending from the boundary between the second flat plate portion 51b and the end portion panel pressing portion 52c, and a second hanging wall 54 downwardly extending from an end portion of the second flat plate portion 51b at the second placement surface 42b side. The second flat plate portion 51b, the end portion panel pressing portion 52c, and the hanging wall 53b have the same configurations as the flat plate portion 51, the first panel pressing portion 52a, and the hanging wall 53 of the securing tool 1, respectively.

The end portion upper holder 50b having the above-described configuration is secured to the lower holder 40 by fastening, to the first screwed groove 45 of the lower holder 40, the bolt 30 inserted through a bolt hole portion of the second flat plate portion 51b from above. The panel member P is held between the end portion panel pressing portion 52c and the first placement surface 42a by placing the panel member P on the first placement surface 42a of the lower holder 40. The second hanging wall 54 is set such that when the panel member P having the maximum height in the height range of the panel members P as the mounting targets is held between the end portion upper holder 50b and the lower holder 40, the second hanging wall 54 covers the upper portion of the second wall 44b for the length of 5 mm to 10 mm from the eaves side and when the panel member P having the minimum height is held between the end portion upper holder 50b and the lower holder 40, a gap of 2 mm to 5 mm is formed between the second hanging wall 54 and the second placement surface 42b.

Although the end portion securing tool 1b holds no panel member P at the eaves side, abutment of the second hanging wall 54 against the second wall 44b from the eaves side prevents the end portion upper holder 50b from being inclined so as to be lowered to the eaves side when the bolt 30 is fastened to the first screwed groove 45. Further, the second hanging wall 54 covers a space above the second wall 44b from the eaves side, so that an outer appearance when seen from the eaves side is therefore made preferable even without using the eaves cover.

The end portion securing tool 1c illustrated in FIG. 10B is different from the securing tool 1 only in the point that it includes an end portion upper holder 50c instead of the upper holder 50 and is the same as the securing tool 1 in the other configurations (the stand 10, the shaft 20, the bolt 30, and the lower holder 40). The end portion securing tool 1c is mounted on the roof face R with the above-described base member 60 interposed therebetween in the same manner as the securing tool 1. The end portion upper holder 50c includes the end portion pressing portion 52c and the hanging wall 53b having the same configurations as those of the above-described end portion upper holder 50b. Further, the end portion upper holder 50c includes a second hanging wall 54b instead of the second hanging wall 54, and includes a covering portion 57 and a cover base portion 58 additionally.

The second hanging wall 54b extends upward relative to the second flat plate portion 51b and the height of the upper end thereof is substantially equal to the height of the end portion panel pressing portion 52c. The cover base portion 58 extends perpendicularly to the second hanging wall 54b toward the eaves side from the vicinity of the lower end of the second hanging wall 54b. The covering portion 57 connects the upper end of the second hanging wall 54b and the front end of the cover base portion 58 in a curved form. With this configuration, in the end portion securing tool 1c, abutment of the second hanging wall 54b against the second wall 44b prevents the end portion upper holder 50c from being inclined when the bolt 30 is fastened to the first screwed groove 45 in the same manner as the end portion securing tool 1b. Further, the covering portion 57 covers a space above the second wall 44b from the eaves side, so that an outer appearance when seen from the eaves side is therefore made preferable. That is to say, the end portion upper holder 50c serves as an upper holder and an eaves cover.

The end portion securing tool 1d illustrated in FIG. 10C is different from the securing tool 1 only in the point that it includes an end portion upper holder 50d instead of the upper holder 50 and is the same as the securing tool 1 in the other configurations (the stand 10, the shaft 20, the bolt 30, and the lower holder 40). The end portion securing tool 1d is mounted on the roof face R with the above-described base member 60 interposed therebetween in the same manner as the securing tool 1. The end portion upper holder 50d includes the second flat plate portion 51b, the end portion pressing portion 52c, the hanging wall 53b, and the second hanging wall 54 having the same configurations as those of the above-described end portion upper holder 50b. Further, the end portion upper holder 50d further includes a third hanging wall 54c additionally.

The third hanging wall 54c downwardly extends from the second flat plate portion 51 so as to be spaced from the second hanging wall 54 at the eaves side relative to the second hanging wall 54. The third hanging wall 54c and the second hanging wall 54 are parallel to each other and have lengths equal to each other. With this configuration, in the end portion securing tool 1d, abutment of the second hanging wall 54 against the second wall 44b prevents the end portion upper holder 50d from being inclined when the bolt 30 is fastened to the first screwed groove 45 in the same manner as the end portion securing tool 1b and the end portion securing tool 1c. Further, the second hanging wall 54 and the third hanging wall 54c cover a space above the second wall 44b from the eaves side, so that an outer appearance when seen from the eaves side is therefore made preferable.

As described above, when the end portion upper holder 50d is used as the upper holder, the outer appearance when seen from the eaves side is preferable. Therefore, the end portion securing tool 1d can also be used without holding no eaves cover. Alternatively, the end portion securing tool 1d can also be used in a state of holding an eaves cover 70b as illustrated in FIGS. 11A and 11B.

The eaves cover 70b includes the cover base 71, the cover standing wall 72, the covering portion 73, and the fitting arm 78 having the same configurations as those of the above-described eaves cover 70. The eaves cover 70b is different from the eaves cover 70 in the point that it does not include the locking piece 74 and the locking portion 75 and includes a second cover standing wall 76. The second cover standing wall 76 perpendicularly stands from the cover base 71 so as to be spaced from the cover standing wall 72 at the ridge side relative to the cover standing wall 72. The height of the second cover standing wall 76 is set such that the height from the second placement surface 42b is substantially equal to the second wall 44b in a state in which the cover base 71 is placed on the second placement surface 42b.

In the same manner as the eaves cover 70, the eaves cover 70b having the above-described configuration is held on the lower holder 40 in the state in which the cover base 71 is placed on the second placement surface 42b, the second placement surface 42b and the rib 48 of the lower holder 40 are inserted into the space between the cover base 71 and the fitting arm 78, and the hook 78f is caught by the hook 48f. Further, when the end portion upper holder 50d is secured to the lower holder 40 by fastening the bolt 30 to the first screwed groove 45 in a state in which the second cover standing wall 76 is located in the space between the second hanging wall 54 and the third hanging wall 54c, the eaves cover 70b is prevented from being detached from the end portion securing tool 1d reliably.

Figure 11A:
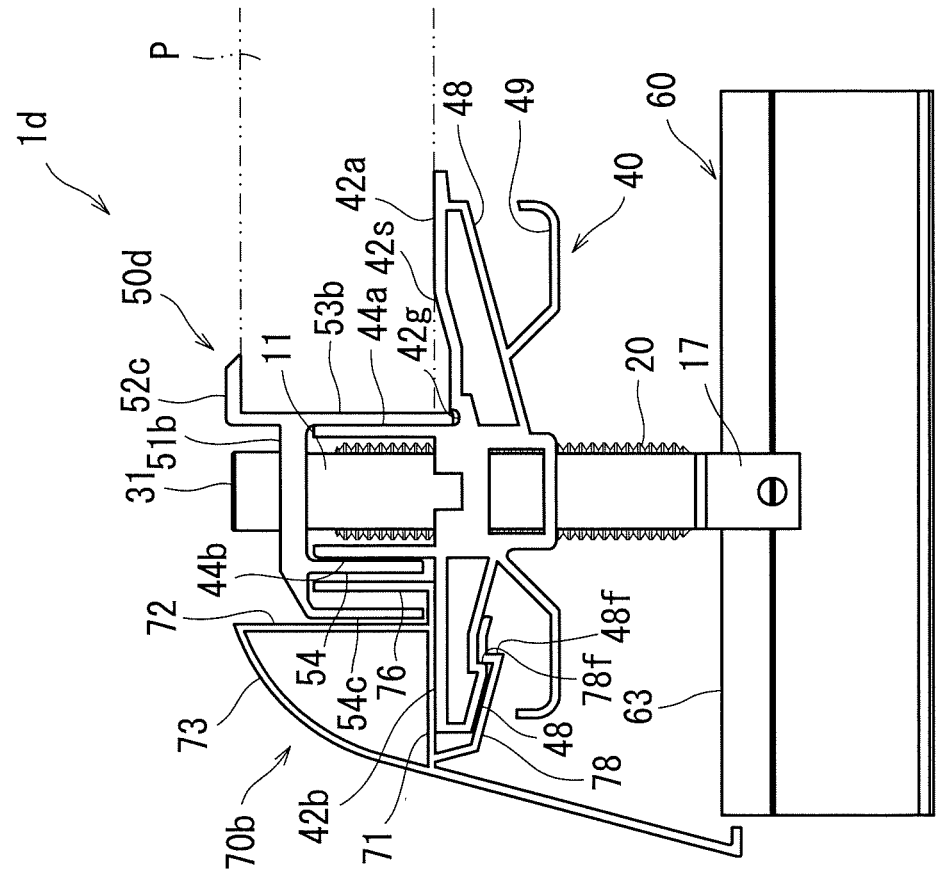
FIGS. 11A and 11B are front views for explaining holding and height adjustment of the eaves cover with the securing tool for which the end portion upper holder in FIG. 10C is used.
Figure 11B:
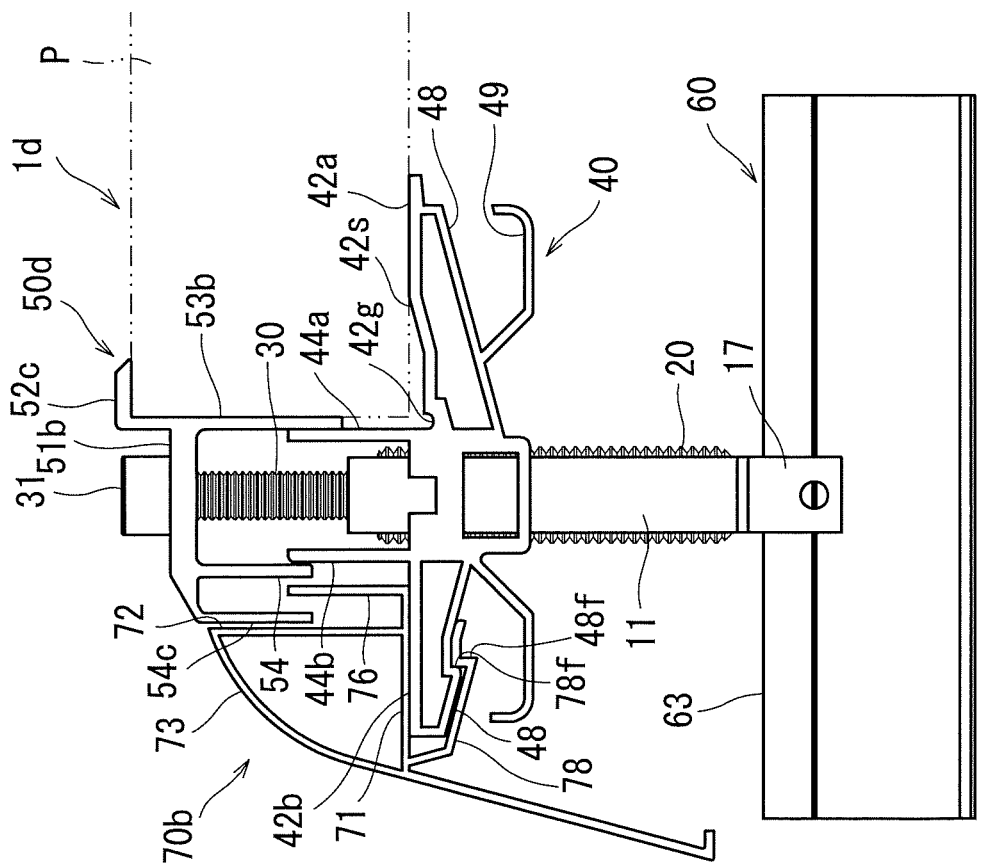

As illustrated in FIG. 11A, the second hanging wall 54 and the third hanging wall 54c are set such that when the panel member P having the maximum height in the height range of the panel members P as the mounting targets is held between the end portion upper holder 50d and the lower holder 40, the second hanging wall 54 covers the upper portion of the second wall 44b for the length of 5 mm to 10 mm from the eaves side and the third hanging wall 54c covers an upper portion of the second cover standing wall 76 for the same length from the eaves side. In addition, as illustrated in FIG. 11B, the second hanging wall 54 and the third hanging wall 54c are set such that when the panel member P having the minimum height in the height range of the panel members P as the mounting targets is held between the end portion upper holder 50d and the lower holder 40, a gap of 3 mm to 6 mm is formed between the second hanging wall 54 and the second placement surface 42b and a gap of 1 mm to 4 mm is generated between the third hanging wall 54c and the cover base 71.

As described above, by preparing, as an optional member, at least any of the end portion upper holders 50b, 50c, and 50d capable of replacing the upper holder 50 of the securing tool 1, a securing tool exclusive for the end portion (end portion securing tool 1b, 1c or 1d) can be configured using the components of the securing tool 1 other than the upper holder 50 as they are. Accordingly, variations of the securing tools capable of meeting diverse requests from the user for the necessity of the eaves cover, the outer appearance when seen from the eaves side, and the like can be provided while the component management is easily performed without excessively increasing the number of components.

Although the present invention has been described above using the preferred embodiment, the present invention is not limited by the above-described embodiment and various improvements and changes in design can be made in a range without departing from the aspect of the present invention. It should be noted that hereinafter, the same reference numerals denote the same configurations as those in the above-described embodiment and detail description thereof is omitted.

Figure 12A:
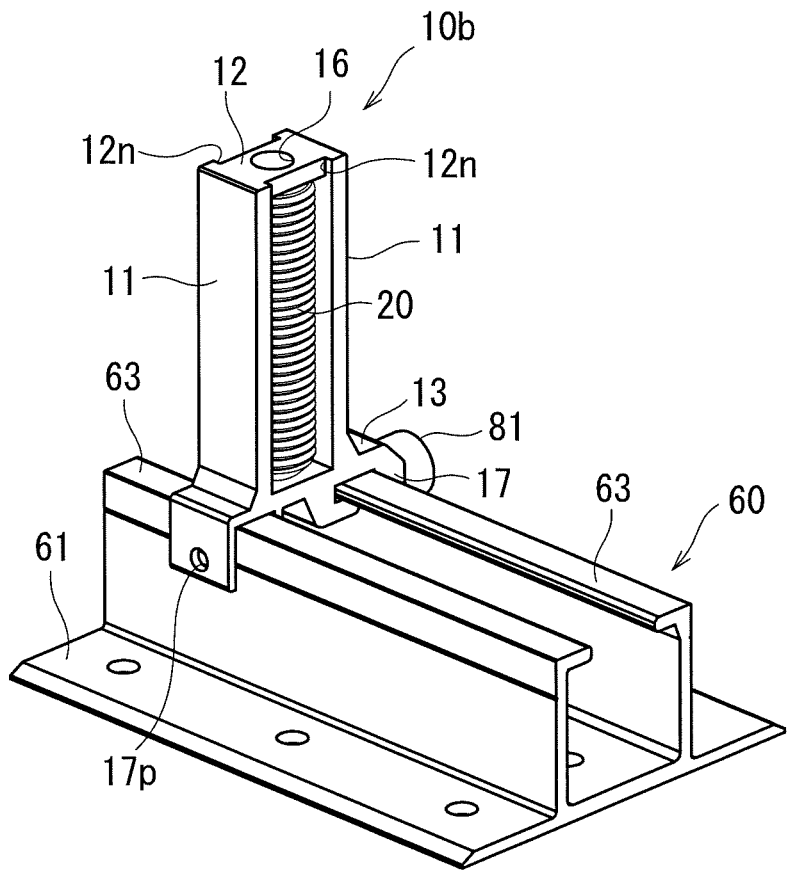
FIG. 12A is a perspective view illustrating a stand in a variation and FIG. 12B is a perspective view illustrating a lower holder in a variation, which corresponds to the stand in FIG. 12A.
Figure 12B:
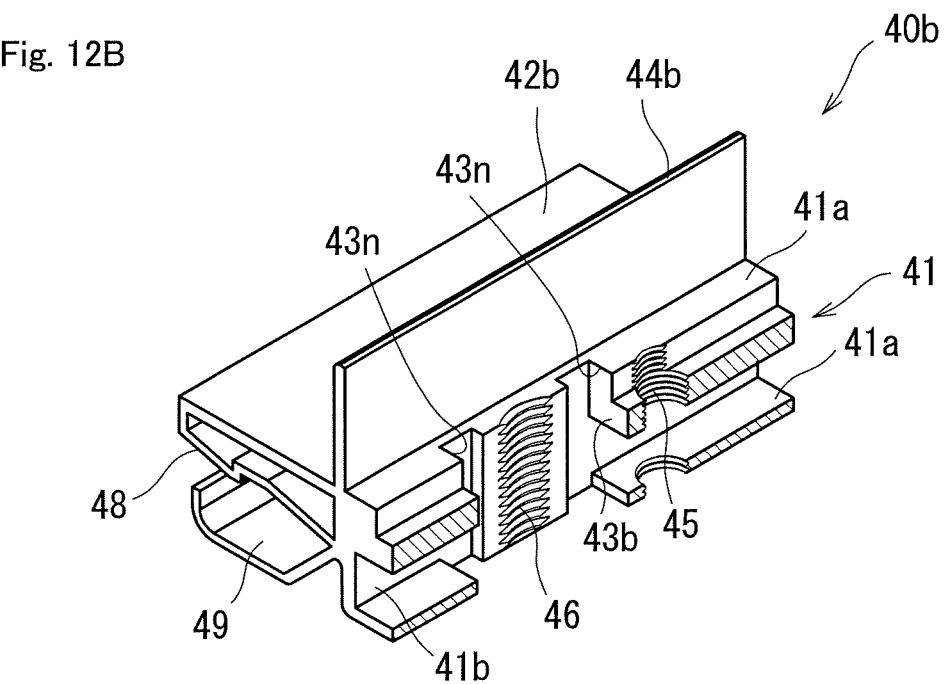

For example, as components of the securing tool 1 or the end portion securing tool 1b, 1c, or 1d, a stand 10b illustrated in FIG. 12A can be used instead of the stand 10 and a lower holder 40b illustrated in FIG. 12B can be used instead of the lower holder 40. In the stand 10, the width of the side wall portions 11 is set to be smaller than the diameter of the shaft 20. On the other hand, the width of the side wall portions 11 of the stand 10b is set to be larger than the diameter of the shaft 20. The mechanical strength of the stand 10b can therefore be further increased in comparison with the mechanical strength of the stand 10. Note that the external thread 21 of the shaft 20 which is held in the stand needs to be exposed from the stand in the radial direction in order to be screwed with the second screwed groove 46. Therefore, the stand 10b has cutouts 12n provided in the top surface portion 12 such that the top surface portion 12 has an H shape when seen from the above.

The lower holder 40b has recesses 43n formed for receiving projecting portions of the stand 10b having the cutouts 12n at both sides of the second screwed groove 46 on the inner circumferential surface of a cylindrical portion 43b through which the stand 10b is inserted. The external thread 21 exposed from the stand 10b can be screwed with the second screwed groove 46 in a space at an extended place of the cutouts 12n in the axial direction.

Further, in the above-described embodiment, the tool hole portion 16 located on the extended line of the center axis of the shaft 20 is penetratingly provided in the top surface portion 12 of the stand 10 or 10b. The stand is not limited thereto, and a stand having the configuration in which instead of the top surface portion, a pair of upper shelf portions extends toward each other from the vicinities of the upper ends of the pair of the side wall portions of the stand can be employed. When a space is provided between the pair of upper shelf portions on the extended line of the center axis of the shaft, the tool can be made to reach the tool engagement portion of the shaft while passing through the space.

In addition, as the construction of mounting the panel members P on the roof face R using the securing tools 1 in one direction, the panel members P are mounted toward the ridge from the eaves, as the example, in the above description. The construction manner is not limited thereto, and the direction of mounting the panel members P can be set to a lateral direction orthogonal to the eaves-ridge direction. In this case, the progress direction of the construction can be set to the direction toward the right side from the left side when seen from the eaves side or the opposite direction thereto. It should be noted that the second placement surface 42b side of the securing tool 1 is set to the starting end of the construction. It is sufficient that the construction in the lateral direction is performed while in the above description for the construction in the eaves-ridge direction, the "eaves" is replaced by a "starting end" and the "ridge" is replaced by a "termination end".

When the construction is progressed in the lateral direction, the end portion securing tool 1b formed by replacing the upper holder 50 of the securing tool 1 by the end portion upper holder 50b can be used as the securing tool at the starting end. Alternatively, the end portion securing tool 1d formed by replacing the upper holder 50 of the securing tool 1 by the end portion upper holder 50d can be used without holding the eaves cover 70b.

On the other hand, the securing tool at the termination end when the construction is progressed in the lateral direction can be the securing tool 1 holding no panel member P at the first placement surface 42a side, and the end portion securing tool 1b or the end portion securing tool 1d can also be used while the right and left sides are reversed. Alternatively, the end portion securing tool 1b or the end portion securing tool 1d can also be used while the right and left sides of only the end portion upper holder 50b or 50d are reversed. In this case, by providing a groove, which is similar to the groove 42g in the first placement surface 42a, in the second placement surface 42b of the lower holder 40 so as to be along the second wall 44b, the hanging wall 53b is prevented from abutting against the second placement surface 42b when the panel member P having the minimum height in the height range of the mounting targets is placed on the second placement surface 42b.

The securing tool at the ridge end when the construction is progressed in the eaves-ridge direction can be the securing tool 1 holding no panel member P at the first placement surface 42a side as described above. Alternatively, the end portion securing tool 1b or the end portion securing tool 1d can also be used therefor while the direction thereof is reversed from that at the eaves end or the direction of only the end portion upper holder 50b or 50d is reversed for use, in the same manner as the securing tool at the terminal end when the construction is progressed in the lateral direction.

What is claimed is:
1. A panel member securing structure comprising:
a base member fastened to a roof face, and a securing tool securing at least one panel member to the base member,
wherein the securing tool includes a stand, a lower holder that moves up and down along the stand, an upper holder that holds the panel member together with the lower holder, and a shaft that has an external thread formed on an outer circumferential surface,
the stand has a pair of side wall portions and holds the shaft between the side wall portions in a state of restricting movement of the shaft in an axial direction,
the shaft is exposed from the stand in a radial direction of the external thread and has a tool engagement portion on an end portion,
the lower holder has a center portion in which a cylindrical portion through which the stand is inserted is penetratingly provided, a first screwed groove which is formed at such a position as not to interfere with the cylindrical portion in the center portion, a second screwed groove which is formed on an inner circumferential surface of the cylindrical portion, and a first placement surface and a second placement surface which extend in directions orthogonal to an axial direction of the cylindrical portion at both of outer sides of the center portion,
the upper holder has a flat plate portion in which a bolt hole portion and a tool hole portion are penetratingly provided, a first panel pressing portion which extends from the flat plate portion in the same direction as the first placement surface, and a second panel pressing portion which extends from the flat plate portion in the same direction as the second placement surface, the stand extends from the base member, a bolt inserted through the bolt hole portion is fastened to the first screwed groove, so that the panel member is held at least one of between the first placement surface and the first panel pressing portion and between the second placement surface and the second panel pressing portion, a portion of the external thread, which is exposed from the stand, and the second screwed groove are screwed with each other, and the tool hole portion is located on an extended line of a center axis of the shaft and a hole portion or a space is formed in the stand on the extended line between the shaft and the tool hole portion.

2. The panel member securing structure according to claim 1, wherein the upper holder abuts against neither of the first placement surface nor the second placement surface.

3. The panel member securing structure according to claim 1, wherein the upper holder has a hanging wall downwardly extending from a boundary between the first panel pressing portion and the flat plate portion, the lower holder has a first wall extending from a boundary between the center portion and the first placement surface and the first placement surface has an inclination portion, the panel member is held between the second placement surface and the second panel pressing portion, and the hanging wall is along the first wall without abutting against the first placement surface.

4. The panel member securing structure according to claim 1, wherein the lower holder of the securing tool has a second wall extending from a boundary between the center portion and the second placement surface in the lower holder, and an eaves cover is hooked onto an upper end of the second wall.

5. A panel member securing structure comprising:

a base member fastened to a roof face, and a securing tool securing one panel member to the base member, wherein the securing tool includes a stand, a lower holder that moves up and down along the stand, an upper holder that holds the panel member together with the lower holder, and a shaft that has an external thread formed on an outer circumferential surface, the stand has a pair of side wall portions and holds the shaft between the side wall portions in a state of restricting movement of the shaft in an axial direction, the shaft is exposed from the stand in a radial direction of the external thread and has a tool engagement portion on an end portion, the lower holder has a center portion in which a cylindrical portion through which the stand is inserted is penetratingly provided, a first screwed groove which is formed at such a position as not to interfere with the cylindrical portion in the center portion, a second screwed groove which is formed on an inner circumferential surface of the cylindrical portion, a first placement surface and a second placement surface which extend in directions orthogonal to an axial direction of the cylindrical portion at both of outer sides of the center portion, and a second wall extending from a boundary between the center portion and the second placement surface in the lower holder, the upper holder has a second flat plate portion in which a bolt hole portion and a tool hole portion are penetratingly provided, an end portion panel pressing portion that extends from the second flat plate portion in the same direction as the first placement surface, and a second hanging wall that downwardly extends from an end portion of the second flat plate portion at the second placement surface side, the panel member is held between the first placement surface and the end portion panel pressing portion, and the second hanging wall is along the second wall without abutting against the second placement surface.

6. The panel member securing structure according to claim 5, wherein the upper holder has a third hanging wall downwardly extending from the second flat plate portion so as to be spaced from the second hanging wall.

7. A panel member securing tool comprising:

a stand, a lower holder that moves up and down along the stand, an upper holder for holding a panel member together with the lower holder, and a shaft that has an external thread formed on an outer circumferential surface, wherein the stand has a pair of side wall portions and holds the shaft between the side wall portions in a state of restricting movement of the shaft in an axial direction, the shaft is exposed from the stand in a radial direction of the external thread and has a tool engagement portion on an end portion, the lower holder has a center portion in which a cylindrical portion through which the stand is inserted is penetratingly provided, a first screwed groove which is formed at such a position as not to interfere with the cylindrical portion in the center portion, a second screwed groove which is formed on an inner circumferential surface of the cylindrical portion, and a first placement surface and a second placement surface which extend in directions orthogonal to an axial direction of the cylindrical portion at both of outer sides of the center portion, the upper holder has a flat plate portion in which a bolt hole portion and a tool hole portion are penetratingly provided, a first panel pressing portion which extends from the flat plate portion in the same direction as the first placement surface, and a second panel pressing portion which extends from the flat plate portion in the same direction as the second placement surface, a bolt inserted through the bolt hole portion is screwed with the first screwed groove, a portion of the external thread, which is exposed from the stand, and the second screwed groove are screwed with each other, and the tool hole portion is located on an extended line of a center axis of the shaft and a hole portion or a space is formed in the stand on the extended line between the shaft and the tool hole portion.

* * * * *